(12) United States Patent
Duhon et al.

(10) Patent No.: US 11,144,196 B2
(45) Date of Patent: Oct. 12, 2021

(54) OPERATING VISUAL USER INTERFACE CONTROLS WITH INK COMMANDS

(71) Applicant: Microsoft Technology Licensing, LLC, Redmond, WA (US)

(72) Inventors: David Walker Duhon, Redmond, WA (US); Yibo Sun, Fenghua (CN); Xiao Tu, Medina, WA (US); Francis Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/724,085

(22) Filed: Dec. 20, 2019

(65) Prior Publication Data

US 2020/0125253 A1 Apr. 23, 2020

Related U.S. Application Data

(62) Division of application No. 15/084,272, filed on Mar. 29, 2016, now abandoned.

(51) Int. Cl.
*G06F 3/0488* (2013.01)
*G06F 40/171* (2020.01)
*G06F 3/0483* (2013.01)
*G06F 3/0484* (2013.01)
*G06F 3/0486* (2013.01)
(Continued)

(52) U.S. Cl.
CPC ........ *G06F 3/04883* (2013.01); *G06F 3/0482* (2013.01); *G06F 3/0483* (2013.01); *G06F 3/0486* (2013.01); *G06F 3/04842* (2013.01); *G06F 3/04847* (2013.01);
(Continued)

(58) Field of Classification Search
CPC .............. G06F 3/04883; G06F 40/171; G06F 3/04842; G06F 3/0486; G06F 3/0482; G06F 3/0483; G06F 3/04847; G06F 3/03543; G06F 3/038; G06K 9/00402; G06K 9/2081
See application file for complete search history.

(56) References Cited

U.S. PATENT DOCUMENTS 5,953,735 A * 9/1999 Forcier ............... G06F 3/04883
715/273
6,956,562 B1 * 10/2005 O'Hara ................ G06F 3/0482
345/173
(Continued)

FOREIGN PATENT DOCUMENTS

CO 5650195 A2 6/2006
JP H09198546 A 7/1997
(Continued)

OTHER PUBLICATIONS

IOS tutorial 4: A basic media player, Jun. 12, 2013, 26 pages (Year: 2013).*

(Continued)

*Primary Examiner* — Yongjia Pan
(74) *Attorney, Agent, or Firm* — Klarquist Sparkman, LLP

(57) ABSTRACT

A facility enabling a user to operate visual user interface controls with ink commands is described. The facility causes to be displayed a control operable with mouse input, and receives an ink command directed to the displayed control. In response, the facility operates the displayed control in accordance with the received ink command.

2 Claims, 24 Drawing Sheets

(51) Int. Cl.
*G06F 3/0482* (2013.01)
*G06K 9/00* (2006.01)
*G06K 9/20* (2006.01)

(52) U.S. Cl.
CPC ....... *G06F 40/171* (2020.01); *G06K 9/00402* (2013.01); *G06K 9/2081* (2013.01)

(56) References Cited

U.S. PATENT DOCUMENTS

| | | | |
|---|---|---|---|
| 7,120,299 B2* | 10/2006 | Keskar | G06F 3/002 382/187 |
| 7,793,233 B1* | 9/2010 | Sellers | G06F 3/0481 715/805 |
| 9,021,402 B1* | 4/2015 | Li | G06F 3/04883 715/863 |
| 9,459,794 B1* | 10/2016 | Soegiono | G06F 3/04847 |
| 9,619,037 B2* | 4/2017 | St. Clair | G06F 3/017 |
| 9,983,780 B2* | 5/2018 | Baek | G06F 3/0488 |
| 10,037,137 B2* | 7/2018 | Zhang | G06F 3/04883 |
| 10,083,163 B2* | 9/2018 | Hickey | G06F 40/174 |
| 10,088,977 B2* | 10/2018 | Kim | G06F 3/04883 |
| 10,366,153 B2* | 7/2019 | Sellers | G06F 3/0481 |
| 2002/0088651 A1 | 7/2002 | Carini et al. | |
| 2002/0109737 A1* | 8/2002 | Jaeger | G06F 3/0481 715/863 |
| 2003/0156145 A1 | 8/2003 | Hullender | |
| 2004/0119763 A1* | 6/2004 | Mizobuchi | G06F 3/04883 715/863 |
| 2004/0121298 A1 | 6/2004 | Creamer et al. | |
| 2004/0196313 A1* | 10/2004 | Wynn | G06F 40/171 715/779 |
| 2005/0229117 A1* | 10/2005 | Hullender | G06F 3/04883 715/863 |
| 2006/0085767 A1* | 4/2006 | Hinckley | G06F 3/04842 715/863 |
| 2006/0092138 A1* | 5/2006 | Kim | G06F 3/04842 345/173 |
| 2007/0168892 A1* | 7/2007 | Brush | G06Q 10/109 715/751 |
| 2008/0046425 A1* | 2/2008 | Perski | G06F 3/04883 |
| 2008/0084400 A1* | 4/2008 | Rosenberg | H04N 21/422 345/173 |
| 2008/0104020 A1* | 5/2008 | Kato | G06F 16/332 |
| 2009/0003658 A1* | 1/2009 | Zhang | G06K 9/00402 382/113 |
| 2010/0185949 A1* | 7/2010 | Jaeger | G06F 3/0481 715/730 |
| 2011/0066984 A1* | 3/2011 | Li | G06K 9/3208 715/863 |
| 2011/0205170 A1* | 8/2011 | Chang | G06F 3/04883 345/173 |
| 2011/0295877 A1* | 12/2011 | Ying | G06K 9/00402 707/769 |
| 2011/0307505 A1* | 12/2011 | Ito | G06F 16/7837 707/769 |
| 2011/0307840 A1* | 12/2011 | Harris | G06F 3/0482 715/863 |
| 2011/0320976 A1* | 12/2011 | Piersol | G06F 3/0488 715/810 |
| 2012/0030566 A1* | 2/2012 | Victor | G06F 3/04883 715/702 |
| 2012/0293421 A1* | 11/2012 | Santoro | G06F 3/033 345/173 |
| 2012/0302167 A1* | 11/2012 | Yun | G06F 3/0416 455/41.2 |
| 2013/0002801 A1* | 1/2013 | Mock | G06F 3/165 348/14.03 |
| 2013/0139092 A1* | 5/2013 | Hang | H04M 1/72519 715/773 |
| 2013/0227418 A1* | 8/2013 | Sa | G06F 3/017 715/728 |
| 2013/0271409 A1* | 10/2013 | Kim | G06F 3/04842 345/173 |
| 2013/0275865 A1 | 10/2013 | Kim et al. | |
| 2013/0321314 A1* | 12/2013 | Oh | G06F 3/0416 345/173 |
| 2014/0007002 A1* | 1/2014 | Chang | G06F 3/04883 715/780 |
| 2014/0033135 A1* | 1/2014 | Lorenz | G06F 3/0486 715/863 |
| 2014/0053114 A1* | 2/2014 | Kwon | G06F 3/04883 715/863 |
| 2014/0062904 A1* | 3/2014 | Abate | G06F 3/04812 345/173 |
| 2014/0250143 A1* | 9/2014 | Dai | G06K 9/222 707/769 |
| 2014/0289682 A1* | 9/2014 | Vojak | G06F 3/04883 715/863 |
| 2014/0334732 A1* | 11/2014 | Jung | G06F 1/1613 382/188 |
| 2014/0337804 A1* | 11/2014 | Hwang | G06F 3/04883 715/863 |
| 2015/0100916 A1* | 4/2015 | Hanumara | G06F 3/04842 715/785 |
| 2015/0127403 A1* | 5/2015 | Petty | G06F 3/04842 705/7.18 |
| 2015/0248637 A1* | 9/2015 | Lockhart, Jr. | G06Q 10/0835 705/337 |
| 2016/0085424 A1* | 3/2016 | Kim | G06F 3/04842 345/661 |
| 2016/0249043 A1* | 8/2016 | Deng | H04N 13/344 |

FOREIGN PATENT DOCUMENTS

| | | |
|---|---|---|
| JP | 2007145106 A | 6/2007 |
| JP | 2008186120 A | 8/2008 |
| JP | 2013528304 A | 7/2013 |
| JP | 2014215906 A | 11/2014 |
| KR | 20160010510 A | 1/2016 |
| RU | 2536667 C2 | 12/2014 |
| WO | WO-2014011000 A1 * | 1/2014 ........... G06F 3/0483 |

OTHER PUBLICATIONS

"Office Action issued in Russian Federation Patent Application No. 2018134170", dated Jun. 16, 2020, 15 Pages.
"Office Action issued in Israel Patent Application No. 261497", dated Jun. 14, 2020, 7 Pages.
"Office Action Issued in Colombian Patent Application No. NC2018/0010521", dated Apr. 1, 2020, 12 Pages.
"Office Action Issued in Chile Patent Application No. 02719-2018", dated Feb. 13, 2020, 13 Pages.
"Office Action Issued in European Patent Application No. 17716684.0", dated Sep. 17, 2020, 5 Pages.
"Office Action Issued in Japanese Patent Application No. 2018-550357", dated Feb. 16, 2021, 12 Pages.
"First Office Action and Search Report Issued in Chinese Patent Application No. 201780022387.2", dated Nov. 24, 2020, 15 Pages.
"Office Action Issued in Russian Patent Application No. 2018134170", dated Nov. 6, 2020, 13 Pages.
"Office Action Issued in Korean Patent Application No. 10-2018-7031187", Mar. 22, 2021, 8 pages.
"Office Action Issued in Australian Patent Application No. 2017252170", dated Jun. 17, 2021, 4 Pages.

* cited by examiner

| Folders | Inbox | | |
|---|---|---|---|
| Inbox 163 | 1701 OneDrive | Get the free Office Mobile app and work on | 4/21/2014 |
| Junk Email | 1702 Microsoft Office 365 | Still need Office? Explore your options. • Th | 4/17/2014 |
| Drafts | 1703 Microsoft Store | Free Office help is waiting • Schedule an ap | 4/16/2014 |
| Sent Items | 1704 Microsoft Office 365 ✓—1721 | We miss you! Come back to Office 365. • G | 4/14/2014 |
| Deleted Items | 1705 Microsoft Store | Check out the Nokia Lumia 1020 and Icon • | 4/7/2014 |
| | 1706 Microsoft Store ✓—1722 | Final score: $100 Samsung Savings wins • | 4/4/2014 |
| | 1707 OneDrive ✓—1723 | Claim your 100 GB of free storage for a yea | 3/31/2014 |
| | 1708 Microsoft Store | Experience gaming with Xbox One • Smart | 3/31/2014 |
| | 1709 Microsoft Office 365 | Reconnect to Microsoft Office 365 across y | 3/30/2014 |

| Folders | Inbox | | |
|---|---|---|---|
| Inbox 163 | | | All ⌄ |
| Junk Email | 1901 — OneDrive | Get the free Office Mobile app and work on | 4/21/2014 |
| Drafts | 1902 — ~~Microsoft Office 365~~ | ~~Still need Office? Explore your options.~~ | 4/17/2014 |
| Sent Items | 1903 — Microsoft Store | Free Office help is waiting • Schedule an ap | 4/16/2014 |
| Deleted Items | 1904 — Microsoft Office 365 | We miss you! Come back to Office 365. • G | 4/14/2014 |
| | 1905 — Microsoft Store | Check out the Nokia Lumia 1020 and Icon • | 4/7/2014 |
| | 1906 — Microsoft Store | Final score: $100 Samsung Savings wins • | 4/4/2014 |
| | 1907 — OneDrive | Claim your 100 GB of free storage for a yea | 3/31/2014 |
| | 1908 — Microsoft Store | Experience gaming with Xbox One • Smart | 3/31/2014 |
| | 1909 — Microsoft Office 365 | Reconnect to Microsoft Office 365 across y | 3/30/2014 |

*FIG. 19*

OPERATING VISUAL USER INTERFACE CONTROLS WITH INK COMMANDS

CROSS REFERENCE TO RELATED APPLICATION

This application is a divisional of U.S. patent application Ser. No. 15/084,272, filed Mar. 29, 2016. The prior application is incorporated herein by reference in its entirety.

BACKGROUND

Computer visual interfaces—such as those of operating systems, application programs, and web pages—have conventionally been designed to operate on user input received via a mouse and/or a keyboard. For example, it is common for word processing documents to be scrollable in the vertical dimension. In order to move down one page in such a document, the user can press a page down button on the keyboard, or with the mouse click beneath an elevator portion of a displayed scrollbar. To move down a fraction of a page, the user can press a down arrow button on the keyboard, or use the mouse to click on a down arrow portion of the scrollbar. The scrollbar in this example is one kind of a variety of different "visual user interface controls," sometimes referred to herein simply as "controls."

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility enabling a user to operate visual user interface controls with ink commands is described. The facility causes to be displayed a control operable with mouse input, and receives an ink command directed to the displayed control. In response, the facility operates the displayed control in accordance with the received ink command.

BRIEF DESCRIPTION OF THE DRAWINGS

FIGS. 17 and 18 are display diagrams showing the input of a sample check selection command and the facility's response thereto.

FIGS. 19 and 20 are display diagrams showing the input of a sample lineout deletion command and the facility's response thereto.

DETAILED DESCRIPTION

Figure 1:
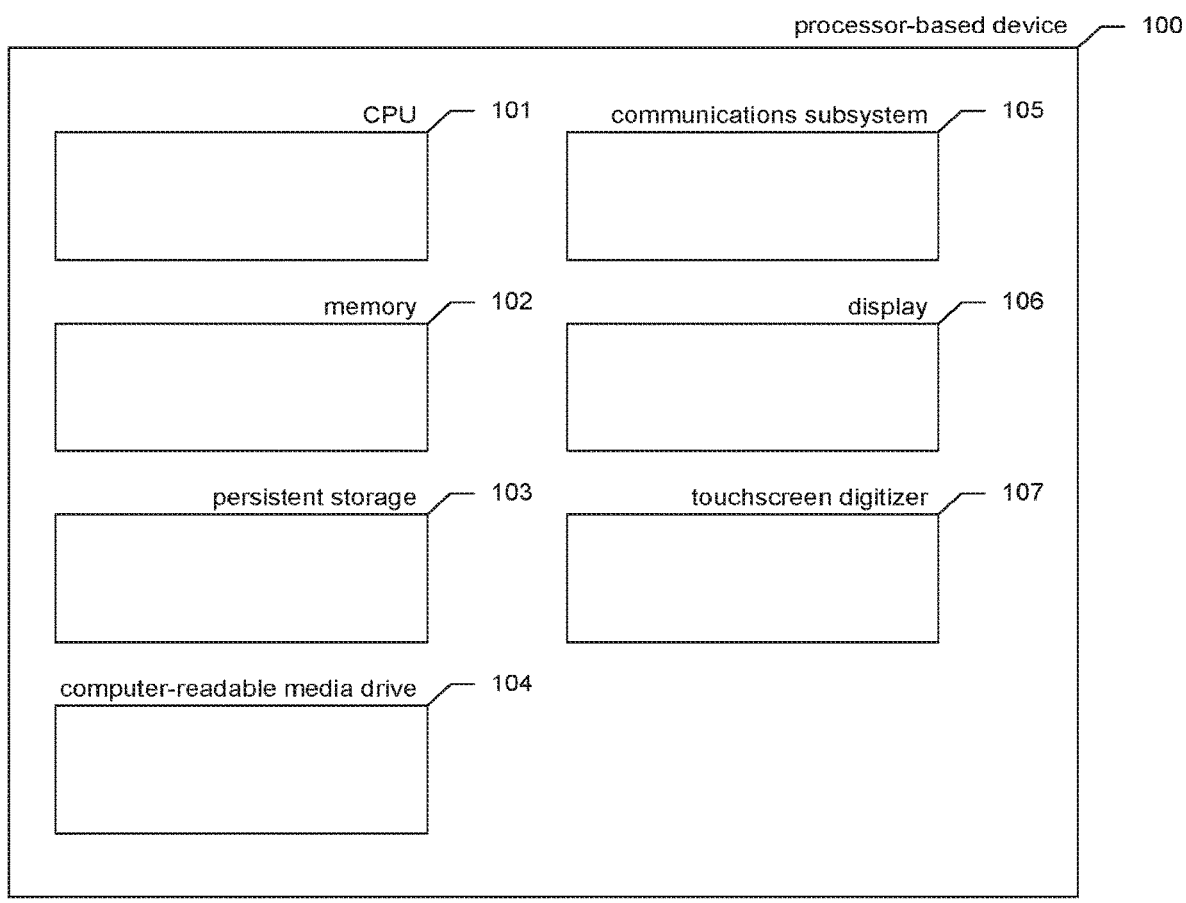
FIG. 1 is a block diagram showing some of the components that may be incorporated in at least some of the computer systems and other devices on which the facility operates.

Computer operating systems have recently added support for electronic ink: a user input technique where the user handwrites, draws, or performs other arbitrary spatial movements. As a result of such user input, visual marks are added to the display that correspond to the path of the movement. For example, in the case of handwriting, handwritten words appear on the display in the same handwriting style that they were executed by the user.

In some cases, the user performs this input by moving a stylus or his or her finger across the surface of the display device. In such cases, the electronic ink generally appears on the display in the positions where the interactions occurred. In some cases, the user performs the inking input by moving a displayed position pointer on the screen, using an input device such as a mouse or touchpad.

In the case of electronic ink corresponding to handwriting, a variety of handwriting shape recognition techniques can be used to identify text represented by the handwriting, which can be displayed in the document along with or in place of the electronic ink handwriting. Similarly, in the case of electronic ink corresponding to shapes, a variety of shape recognition techniques can be used to identify the shapes drawn by the ink.

The inventors have identified new ways for users to interact with conventional visual user interface controls, such as those created with Extensible Application Markup Language ("XAML"), using ink. In particular, the inventors have conceived and reduced to practice a software and/or hardware facility for operating visual user interface controls with ink commands ("the facility"). In various examples, the user generates ink input by writing or drawing on or near a particular control in particular ways. The facility interprets this ink input as an ink command directed to the particular control, and proceeds to operate the control in accordance with the ink command.

For example, in contrast to the conventional manner of scrolling a word processing document described in the Background section, a user can draw a line segment perpendicular to the word processing application document window's vertical scrollbar at a particular point in the scrollbar's height in order to jump to a corresponding location in the document. Alternatively, the user can handwrite numbers on or near the scrollbar corresponding to, for example, page number to jump to, or a percentage of the way through the document to jump to. Similar techniques can be used for other one-dimensional value setting controls, such as sliders, word processing formatting rulers, etc.

In various additional examples, the user can: circle one or more items in a list, grid, or other container control to select the circled items; draw shapes such as a check mark or star next to one or more items in a container to select these items; draw an arrow from items selected in a source container to a destination container in order to transfer the items to the destination container, or to a visual indication of an action that can be performed on the items, such as a visual indication of a printer for printing the items; draw shapes such as a horizontal line segment, a horizontal line segment with a loop at one end, or a scribble over an item in a container to delete the item from the container; draw an approximation of a symbol on a button in order to activate the button, such as ">" to activate a media player play button, or "<<" to activate a media player fast forward button; write a sequence of characters in a container control to subset the items displayed in the containers to those that have text matching the sequence of characters, and/or to select the first or all items having matching text.

In some examples, the use of ink commands in accordance with the facility enables the user to operate in a mode in which some or all visual user interface controls are hidden, conserving display space to be able to display additional substantive content, display substantive content at a higher level of magnification/detail, display other visual information, operate with a smaller display device, etc. This further saves user interactions that would otherwise be needed to toggle the display of visual user interface controls on and off, saving effort and time on the user's part.

In some examples, the facility receives ink commands in isolation, in the absence of both visible user interface controls and hidden user interface controls. For example, in various examples, the facility receives ink commands in a modeless display mode without visible user interface controls, such as a virtual reality or augmented reality display, a gaming display, a video-playing display, etc.; in various examples, such ink commands are received via movement of a finger, a stylus or other held object, a laser pointer, etc.

Compared to spoken commands, the use of ink commands in accordance with the facility can be more accurate, and can benefit from spatial context provided by the display location at which the ink command is written, contrasted with spoken commands that do not relate to any particular display location.

By performing in some or all of the ways described above, the facility enables users to operate many conventional visual interface controls more quickly and/or more accurately than using the forms of input for which they were originally designed, and do so without the disruption of having to set down a stylus, or resume using a mouse or keyboard. In some examples, the facility further provides a reduction in the level of computing resources consumed, such as by removing the need to expend processing resources to process mouse or keyboard commands for which ink commands are substituted, removing the need to equip certain devices with a mouse and/or a keyboard, allowing some devices to employ a smaller display, etc.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

In various examples, these computer systems and other devices 100 may further include any number of the following: a display 106 for presenting visual information, such as text, images, icons, documents, menus, etc.; and a touchscreen digitizer 107 for sensing interactions with the display, such as touching the display with one or more fingers, styluses, or other objects. In various examples, the touchscreen digitizer uses one or more available techniques for sensing interactions with the display, such as resistive sensing, surface acoustic wave sensing, surface capacitance sensing, projected capacitance sensing, infrared grid sensing, infrared acrylic projection sensing, optical imaging sensing, dispersive signal sensing, and acoustic pulse recognition sensing. In various examples, the computer systems and other devices 100 include input devices of various other types, such as keyboards, mice, styluses, etc. (not shown).

While computer systems or other devices configured as described above may be used to support the operation of the facility, those skilled in the art will appreciate that the facility may be implemented using devices of various types and configurations, and having various components.

Figure 2:
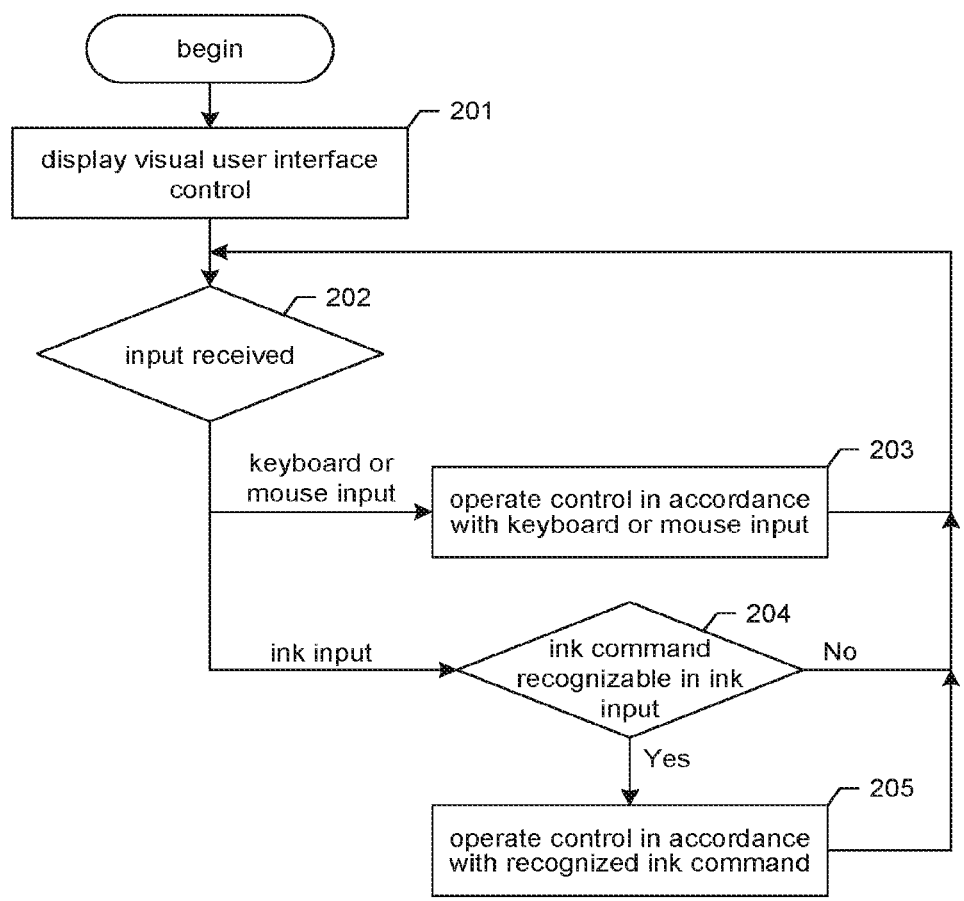
FIG. 2 is a flow diagram showing a process performed by the facility in some examples to manage controls in a way that enables them to be operated with ink commands.

FIG. 2 is a flow diagram showing a process performed by the facility in some examples to manage controls in a way that enables them to be operated with ink commands. In some examples, this process is performed by an operating system executing on the computer system or other device on which the facility operates. Examples depicting the performance of this process are shown in FIGS. 3-24 and discussed below.

At 201, the facility displays one or more visual user interface controls, such as in the context of an operating system shell, an application program, or web page, for example. In some examples, the control or controls displayed at 201 are defined in manners that are completely conventional. In some examples, the control or controls displayed at 201 are defined in a manner that specifies a set of one or more ink commands that can be used to operate each, in some cases including particular ranges of control operation that are permissible with ink commands. At 202, the facility receives user input, and branches on the type of input received: if the input received is keyboard or mouse input, then the facility continues at 203; if the input received is ink input, then the facility continues at 204.

At 203, the facility operates the control displayed at 201 in accordance with the received keyboard or mouse input, such as in the manner that is conventional for the control.

After act 203, the facility continues at 202 to receive further input. At 204, where the received input is ink input, if an ink command is recognizable in the received ink input, then the facility continues at 205, else the facility continues at 202. At 205, the facility operates the control in accordance with the ink command recognized in the received ink input. After act 205, the facility continues at 202.

Those skilled in the art will appreciate that the acts shown in FIG. 2 may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
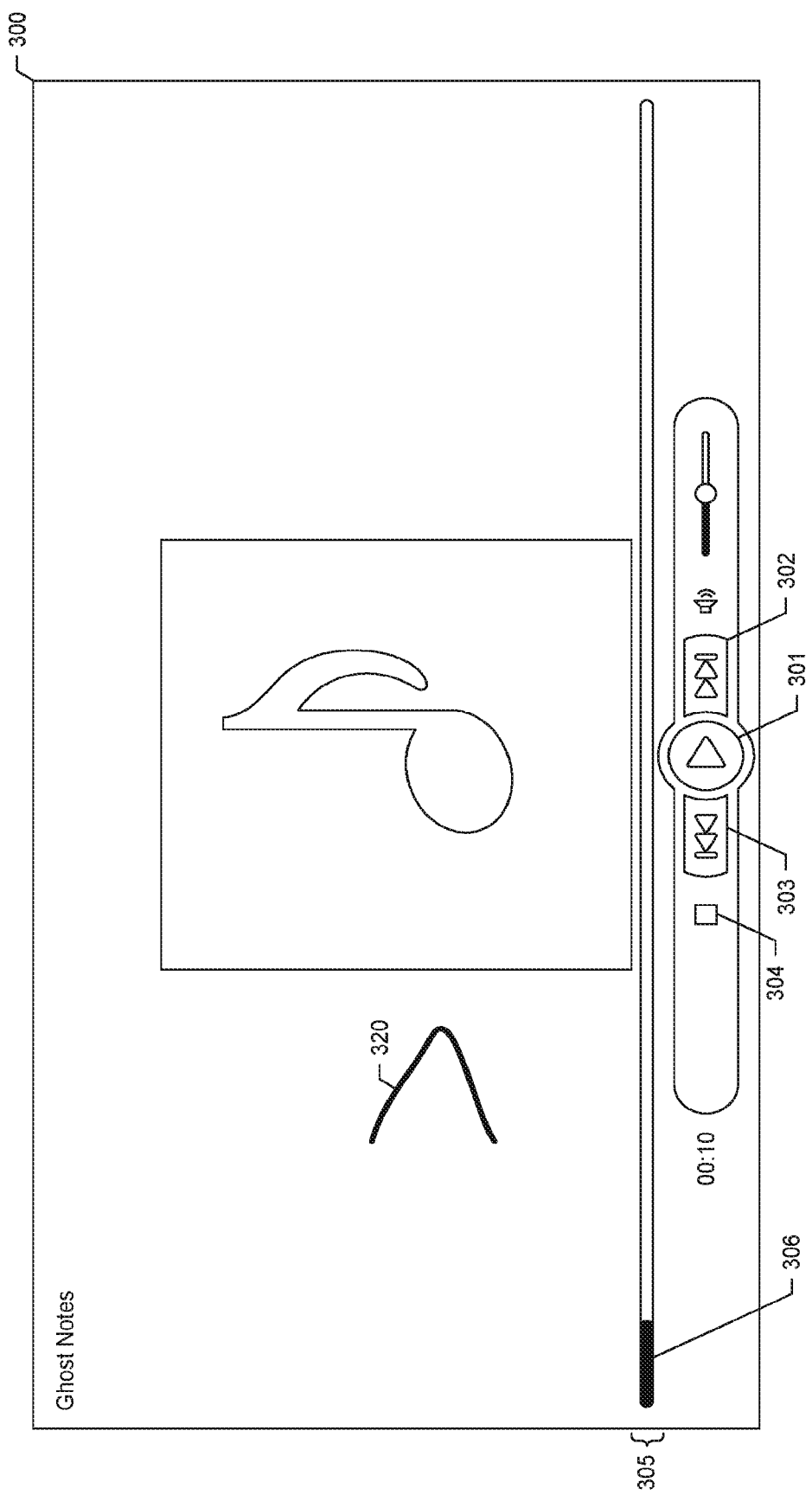
FIGS. 3 and 4 are display diagrams showing the input of a sample command symbol ink command and the facility's response thereto.
Figure 4:
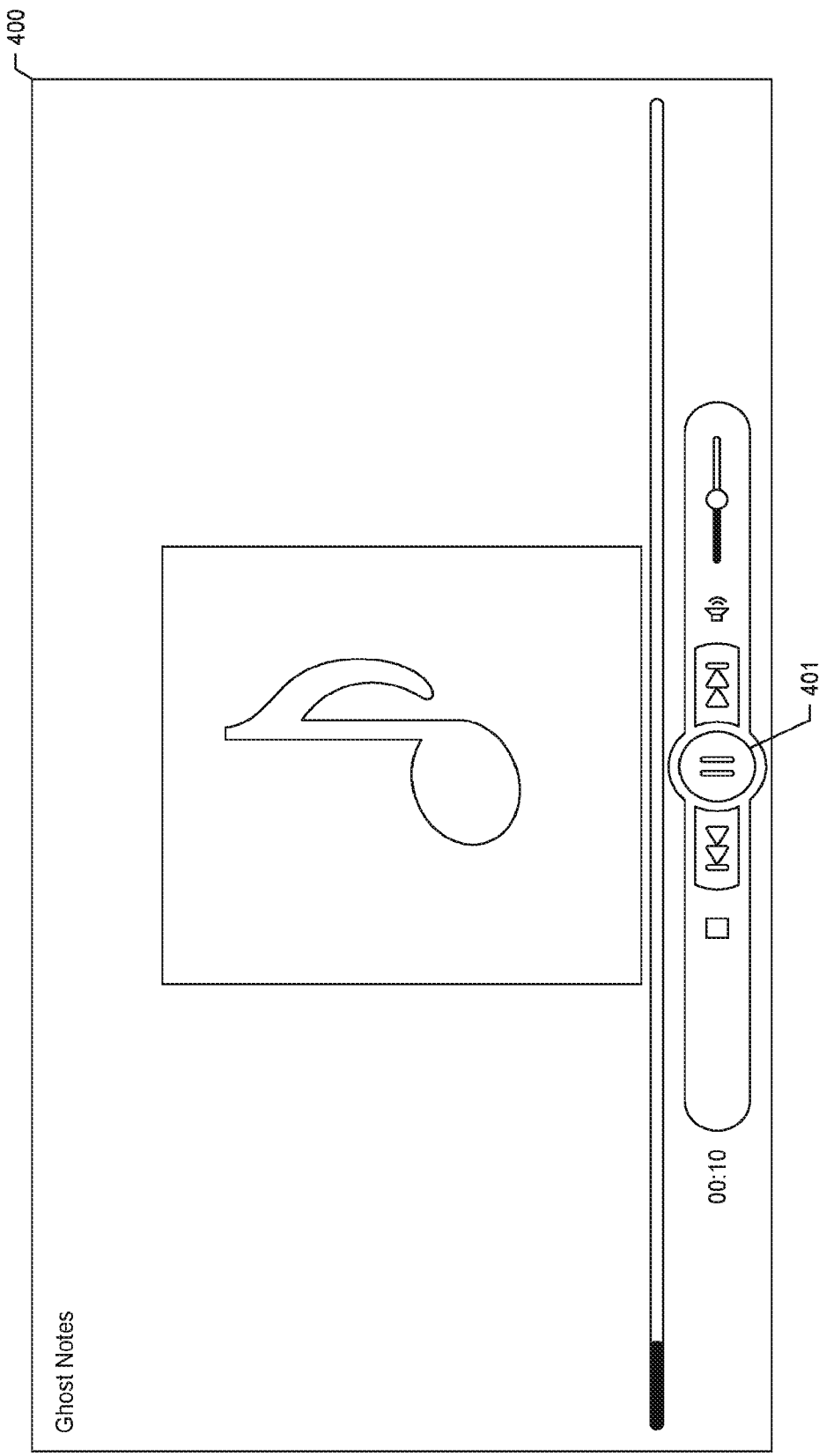

FIGS. 3 and 4 are display diagrams showing the input of a sample command symbol ink command and the facility's response thereto. FIG. 3 shows an initial state of a media player window 300 that is paused in the process of playing an audio sequence. In some examples, such a media player can be used to play a variety of time-indexed media types, including audio sequences, video sequences, animations, slide shows, etc. The media player window contains controls including the following: a play control 301 that the user may activate by, for example, using the mouse to click within it to begin playing of the audio file; a fast forward control 302 that the user may activate by, for example, using the mouse to click within it to advance playback of the audio file quickly to a later time index; a rewind control 303 that the user may activate, such as by using the mouse to click within it to return playback of the audio file to an earlier time index; a stop control 304 that the user may activate by, for example, using the mouse to click within it to end playback of the audio file; and a playback index time control 305 that the user may operate by, for example, dragging its knob 306 to a new horizontal position to change the current playback time index to a corresponding playback time index. The current display of the play control 301 indicates that playback of the audio file is currently paused.

The display further shows the user's generation of ink input 320 forming a ">" play symbol. The facility recognizes ink input 320 as a "play" symbol ink command.

FIG. 4 shows the facility's response to recognizing ink input 320 as a "play" ink command. In many cases, the ink input recognized as a command symbol ink command visually resembles to some extent a symbol associated with the command, such as a symbol displayed within a control that the ink command activates. It can be seen that the effect of this ink command has been to activate play control 301 shown in FIG. 3, resuming playback of the audio file. This playing state is reflected by substitution of a pause control 401 for the play control 301 shown in FIG. 3.

Relative to clicking the play button, using the ink command can be performed more quickly, and with less spatial acuity: where clicking the play button requires a touch or click within the small area of the play button, the ink command can be drawn in a much larger area of the screen. Also, the ink command can be performed immediately at a time when the play button is not displayed (not shown), whereas, in this situation, in order to press the play button, the user must first perform an interaction to display the play button, then touch or click within it.

In various examples, the facility recognizes a variety of similar control symbol ink commands for operating media player controls, in some cases including: a "II" pause ink command for operating the pause control 401; a ">>" fast forward ink command for activating the fast forward control 402; a "<<" ink command for activating the rewind control 403; a "☐" stop ink command for activating the stop control 404; etc.

In some examples, the facility recognizes similar command symbol ink commands in connection with an electronic reader application that displays the contents of a book or other publication for reading. Some examples include a ">" flip single page command to flip one page forward from the current page; a ">>>" triple page flip ink command to flip three pages forward from the current page; a "6>" ink command for flipping forward six pages; etc.

Those of ordinary skill in the art will appreciate that, in various examples, the facility recognizes various similar command symbol ink commands to operate controls of a variety of types in a variety of contexts.

Figure 5:
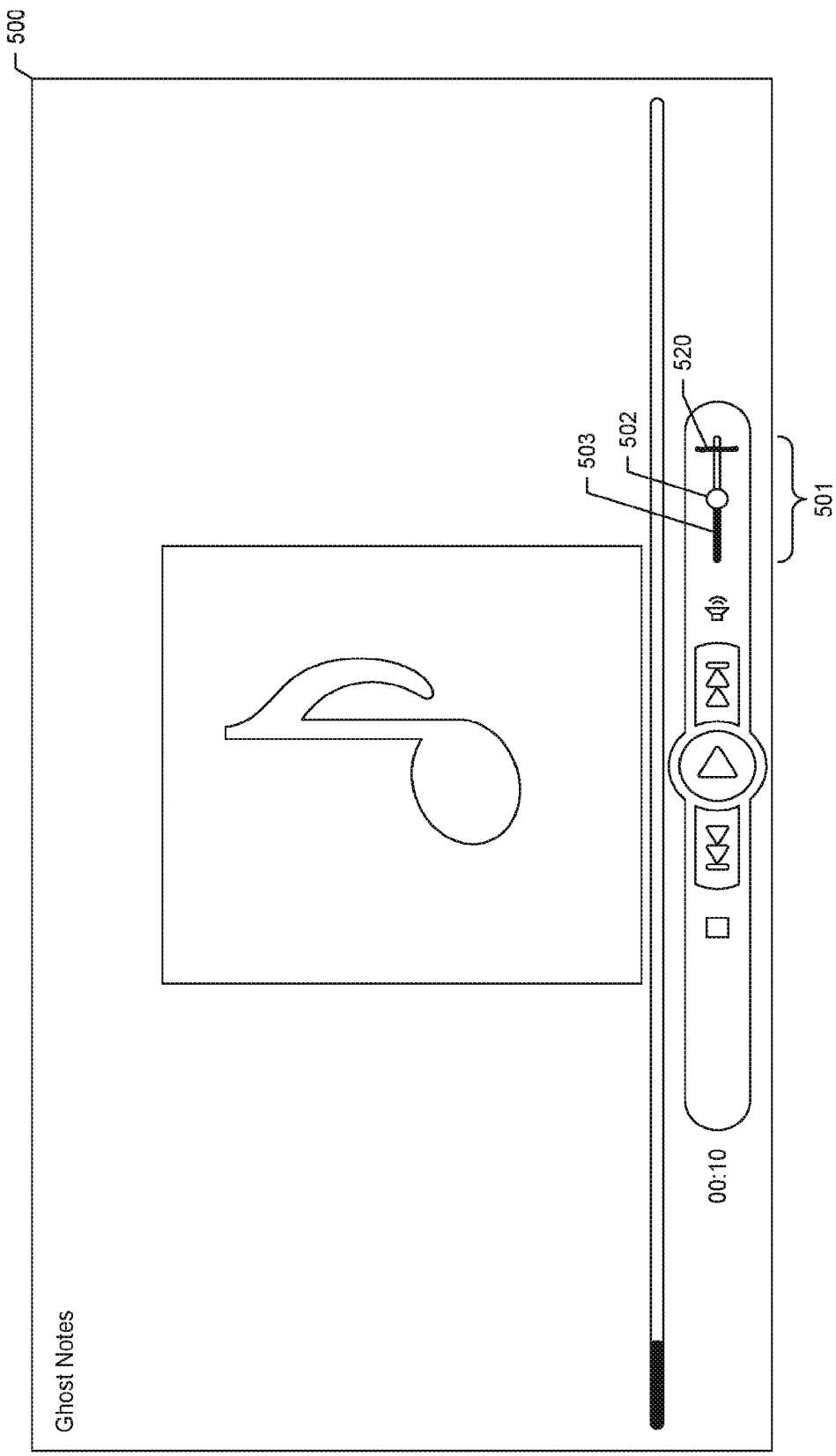
FIGS. 5 and 6 are display diagrams showing the input of a sample slider hashing ink command and the facility's response thereto.
Figure 6:
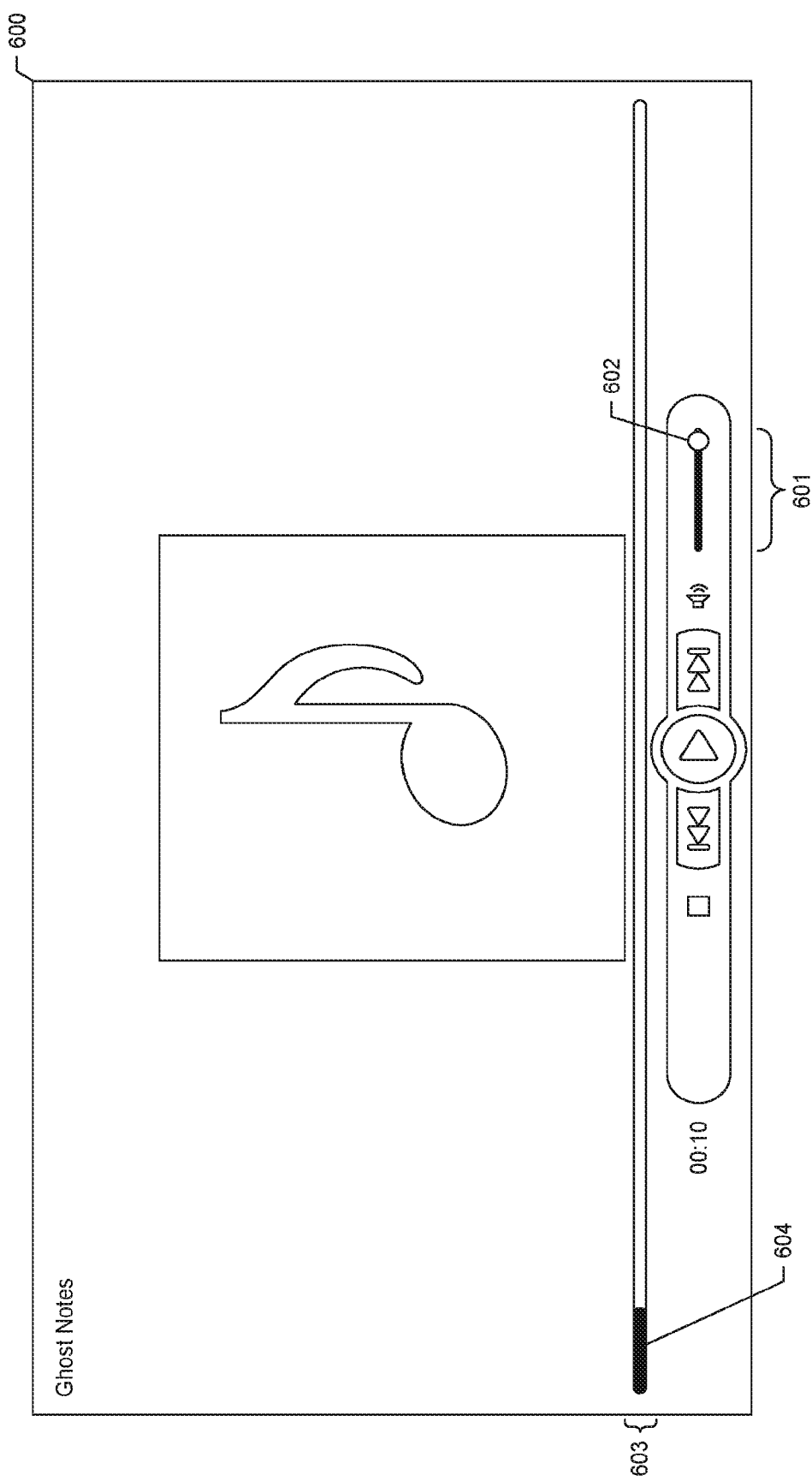

FIGS. 5 and 6 are display diagrams showing the input of a sample slider hashing ink command and the facility's response thereto. FIG. 3 shows an initial state of a media player window 500 that is in the process of playing an audio sequence. The media player window contains controls including a volume slider 501 having a knob 502 that can move to different positions on a track 503 to set the playback volume to points within a permissible range represented by the length of the track. The user can operate the volume slider by, for example, clicking on its knob with the mouse, and dragging the knob to a new horizontal position on the track before releasing the mouse button.

The display further shows the user's generation of ink input 520 forming a roughly vertical hash mark at a particular horizontal position on the volume slider. The facility recognizes ink input 520 as a slider hash mark ink command.

FIG. 6 shows the facility's response to recognizing ink input 520 as a slider hash ink command. It can be seen that the effect of this ink command has been to operate the volume slider, moving its knob 602 to the point where the hash ink input intersected the volume slider.

In various examples, the facility recognizes a variety of similar slider hash ink commands in connection with media player controls, such as the playback time index slider 603.

In various examples, the facility recognizes similar slider hash ink commands to operate a variety of slider controls in a variety of contexts, as well as recognizing similar slider hashing ink commands to operate single-dimensional position controls other than sliders, such as scroll bars, rulers, round analog clock and pie chart controls, etc.

Figure 7:
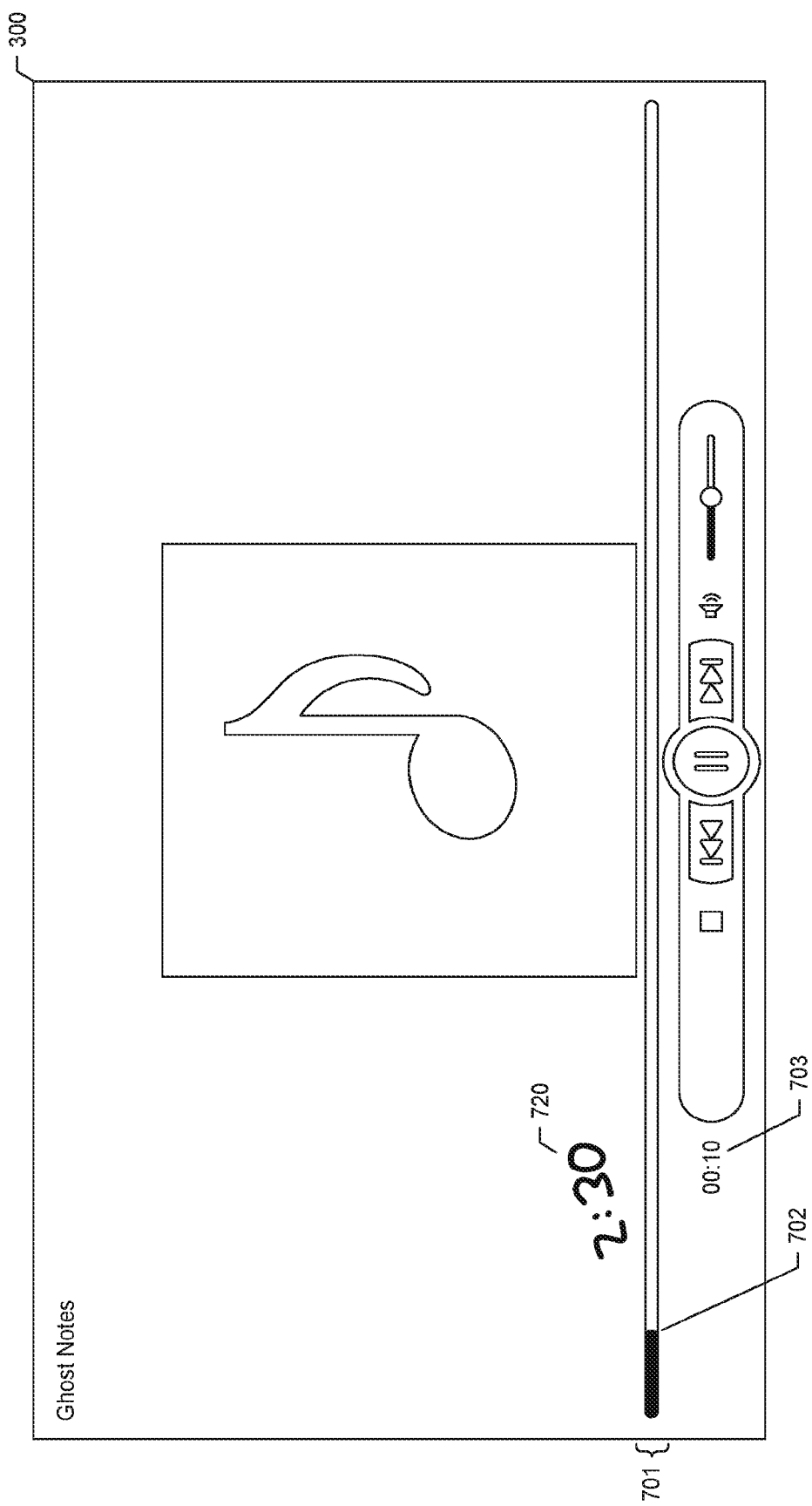
FIGS. 7 and 8 are display diagrams showing the input of a sample numerical textual ink command and the facility's response thereto.
Figure 8:
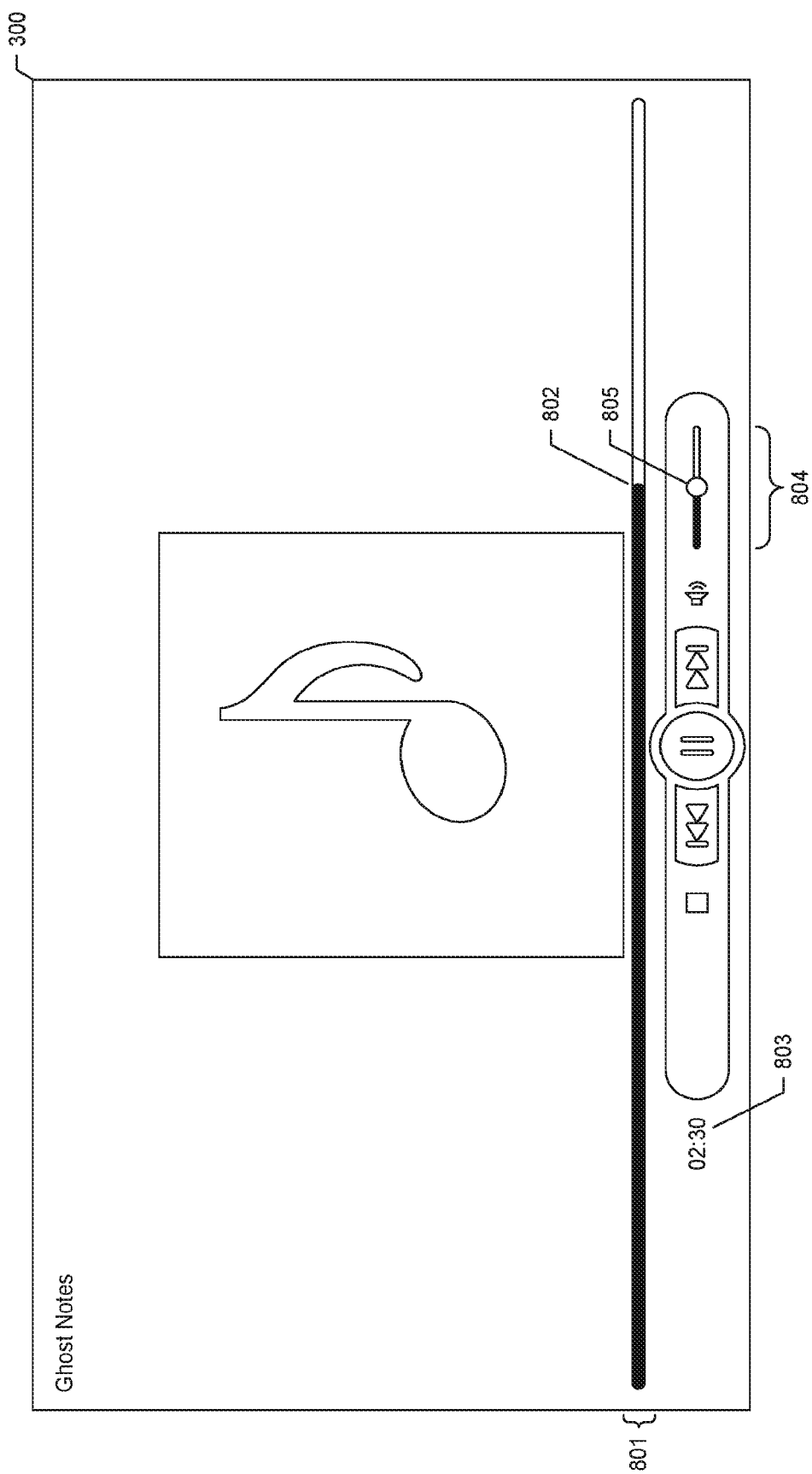

FIGS. 7 and 8 are display diagrams showing the input of a sample numerical textual ink command and the facility's response thereto. FIG. 7 shows an initial state of a media player window 700 that is in the process of playing an audio sequence. The media player window contains controls including a playback time index slider 701, having a knob 702 whose position on the slider indicates a relative position of the current playback time index within the duration of the audio sequence. The media player window 300 also contains a current playback time index display 703, showing the current playback time index to be '00:10'. The user can operate the playback time index slider by, for example, clicking on its knob with the mouse, and dragging the knob to a new horizontal position on the playback time index slider before releasing the mouse button. Doing so (a) relocates the knob on the slider; (b) updates the current playback time index display; and (c) causes playback to resume at the new playback time index.

The display further shows the user's generation of ink input 720 forming the text '2:30'. The facility recognizes ink input 720 as an ink command for jumping to the absolute time index '2:30'.

FIG. 8 shows the facility's response to recognizing ink input 720 as an ink command to jump to absolute playback time index '2:30'. It can be seen that the effect of this ink command has been to change the current playback time index display 803 to '2:30', and move the slider knob 802 to a corresponding position on the playback time index slider 801.

In various examples, the facility recognizes a variety of similar numerical textual ink commands for operating media player controls, such as volume slider 804: the user can write a value such as '25%', or '85 dBA', for example.

In various examples, the facility recognizes similar numerical textual ink commands to operate a variety of controls, such as writing a page number on the page of an electronic reader application to jump to the corresponding page of the book, writing a page number on the vertical scroll bar in a text editing application to jump to the corresponding page of the document being edited, writing a dimension size on a shape in a document in order to scale the shape to the corresponding dimension size, etc.

Figure 9:
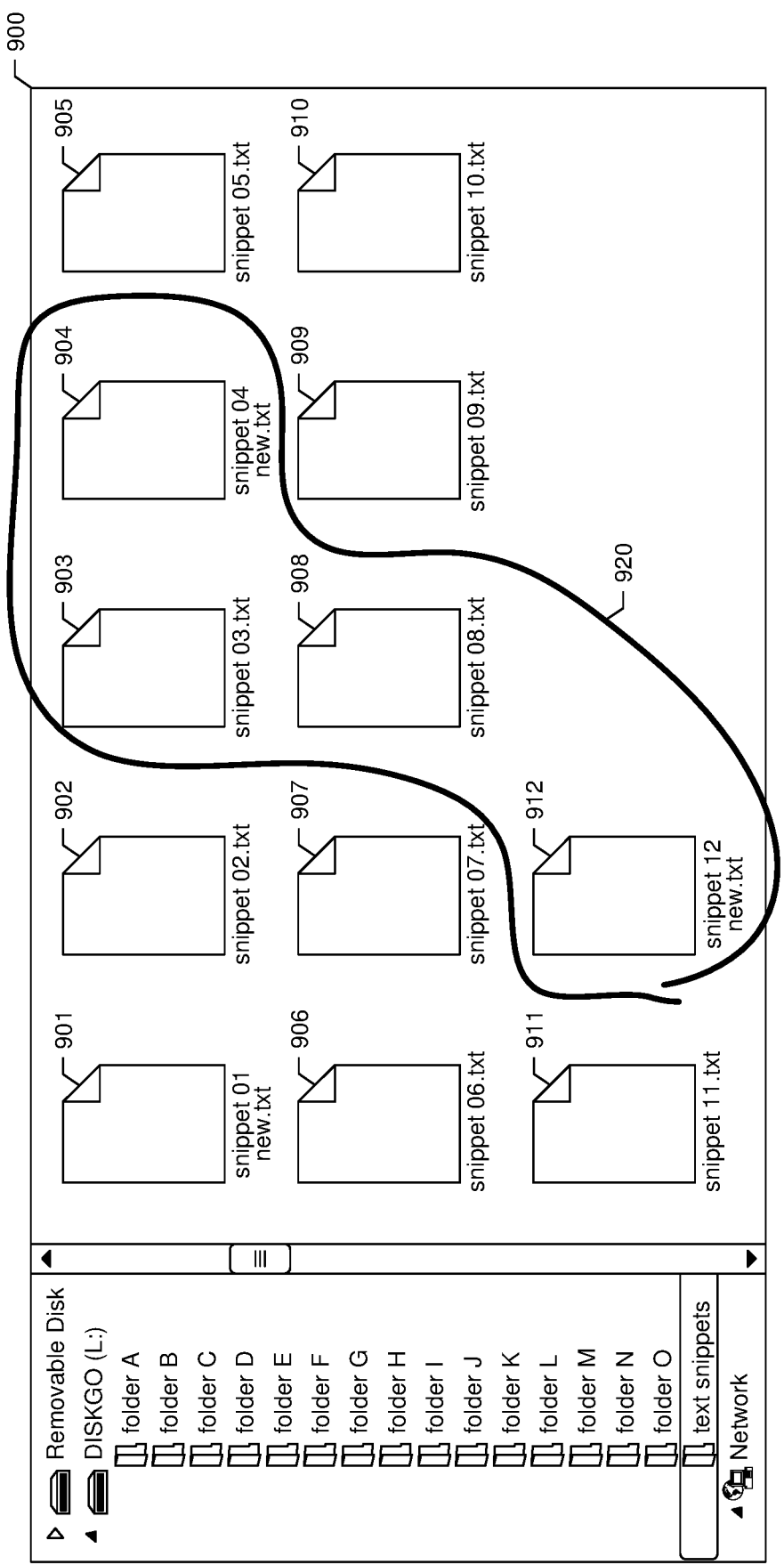
FIGS. 9 and 10 are display diagrams showing the input of a sample enclosing shape item selection command and the facility's response thereto.
Figure 10:
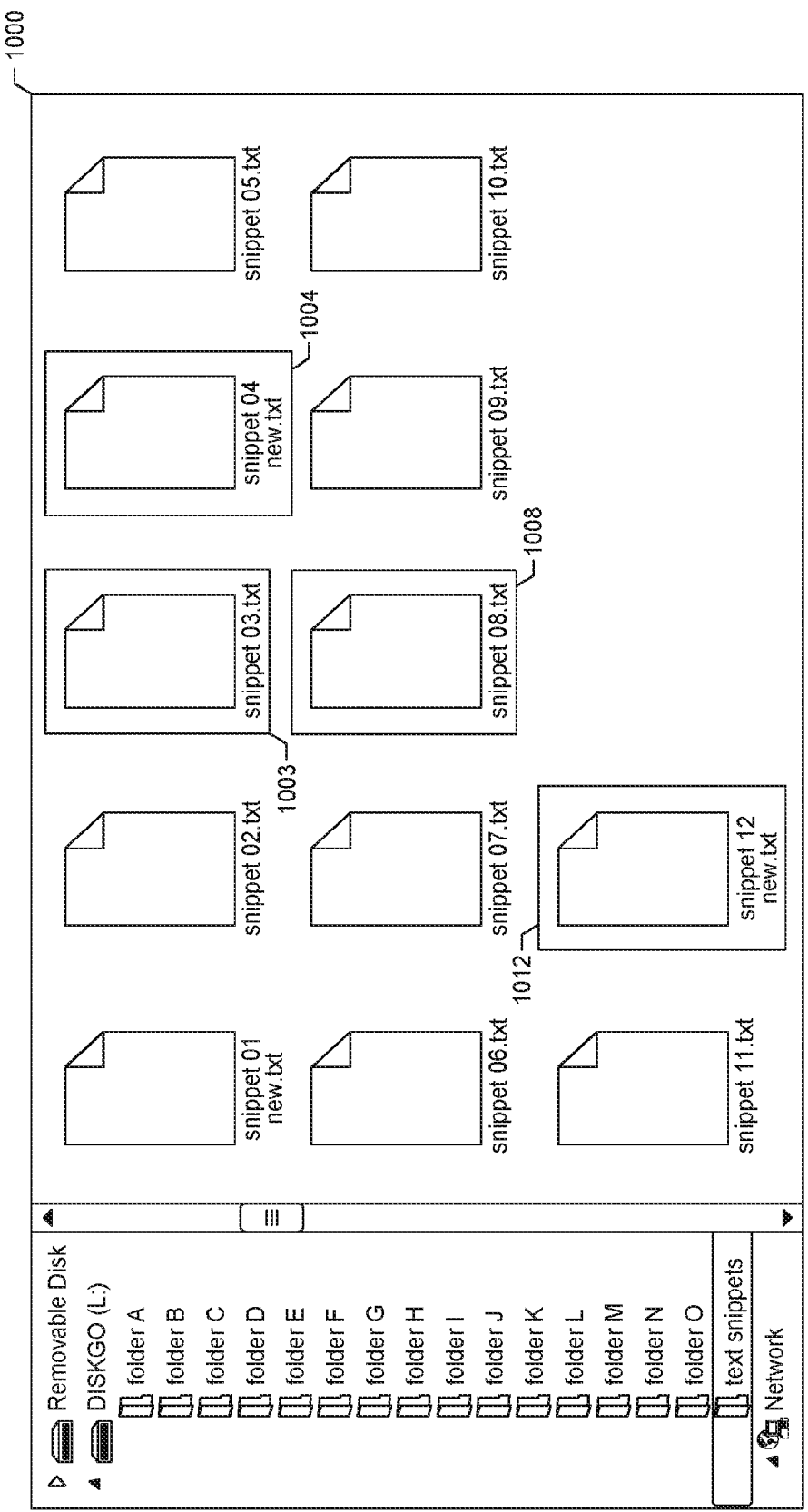

FIGS. 9 and 10 are display diagrams showing the input of a sample enclosing shape item selection command and the facility's response thereto. FIG. 9 shows an initial state of a file system container control window 900 that contains text document items 901-912. The user can select items in the container by, example, holding down the control key on the keyboard and clicking each item to be selected in turn. Once items are selected in the display, the user can subject them all to the same command, such as deleting them, opening them, moving or copying them to a different container, etc.

The display further shows the user's generation of ink input 920 forming an enclosing shape around items 903, 904, 908, and 912. The facility recognizes ink input 920 as an enclosing shape item selection command.

FIG. 10 shows the facility's response to recognizing ink input 920 as an enclosing shape item selection ink command. While in some cases the ink input recognized by the facility as an enclosing shape item selection command is a closed shape, in some examples, the facility recognizes as enclosing shape item selection commands ink input whose shape, while not closed, demonstrates an intent to enclose one or more items. It can be seen that the effect of this ink command has been to select items 1003, 1004, 1008, and 1012, such as to perform a particular file system operation with respect to all of these four items simultaneously.

In various examples, the facility recognizes various similar enclosing shape item selection commands for selecting items of a variety of types within container controls of a variety of types, or in other collections of items, such as lists, trees, diagrams, etc.

Figure 11:
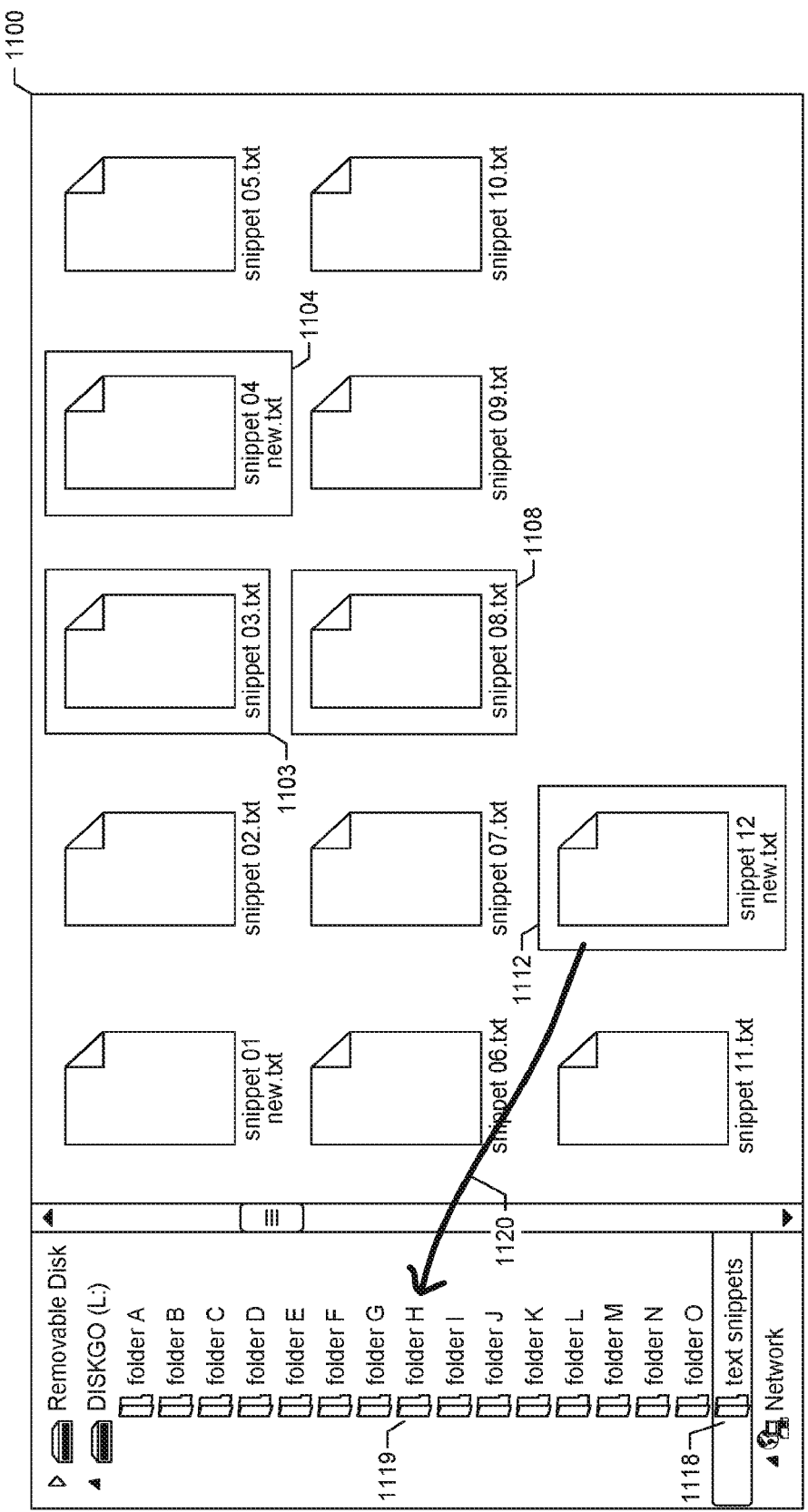
FIGS. 11 and 12 are display diagrams showing the input of a sample item transfer ink command and the facility's response thereto.
Figure 12:
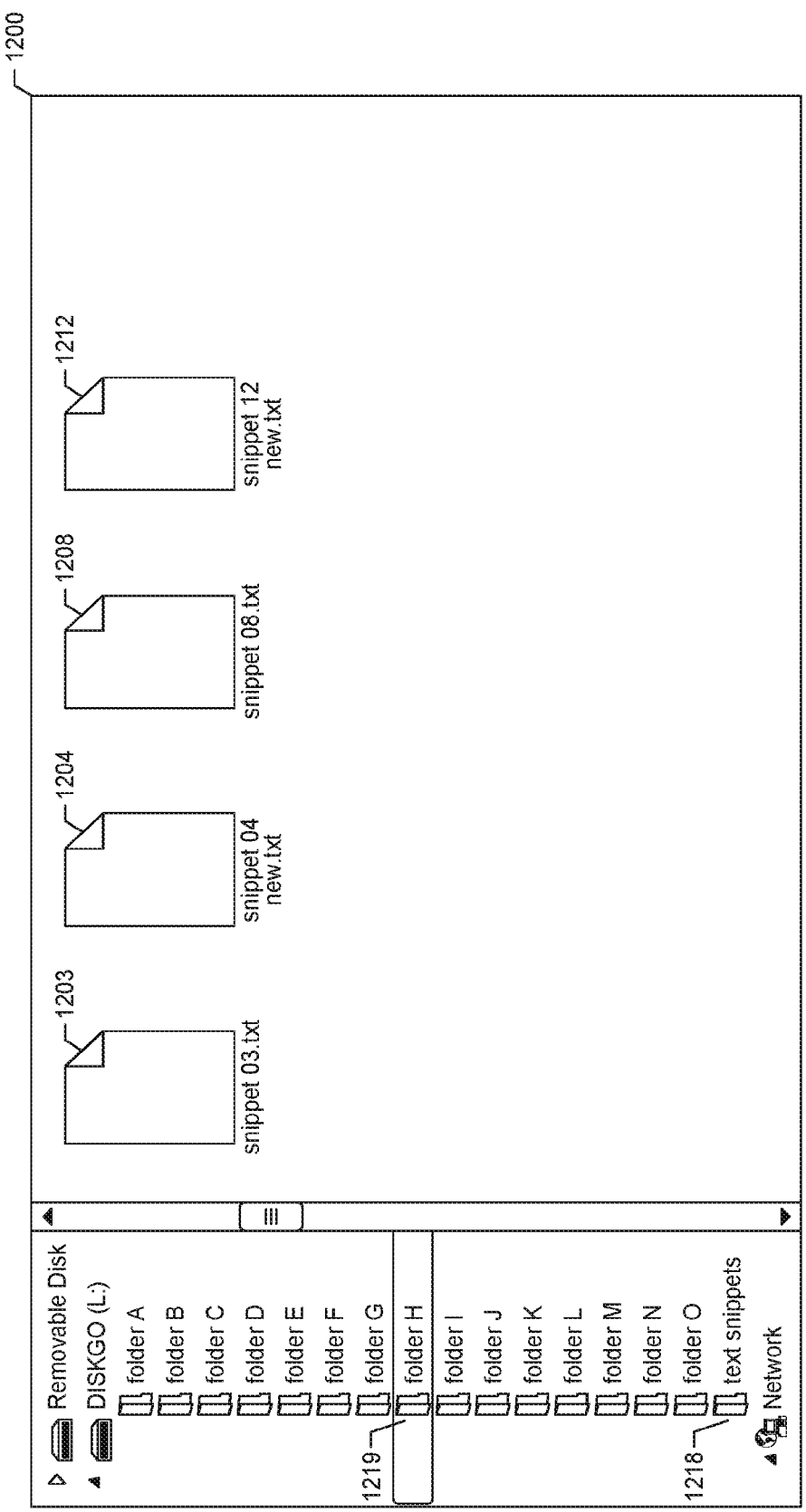

FIGS. 11 and 12 are display diagrams showing the input of a sample item transfer ink command and the facility's response thereto. FIG. 11 shows an initial state of a file system container control 1100. Within this file system container control, it can be seen that items 1103, 1104, 1108, and 1112 are selected. In order to move or copy the four selected items to a different container, the user can, for example, click on one of the selected items with the mouse, and drag this item to the container before releasing the mouse button.

The display further shows the user's generation of ink input 1120 forming an arrow from one of the selected items to a representation 1119 of a different file system container, 'folder H'. The facility recognizes ink input 1120 as an item transfer ink command.

FIG. 12 shows the facility's response to recognizing input 1120 as an item transfer ink command. In some cases, ink input recognized by the facility as an item transfer command specifies transferring the effected items to a variety of destinations, including file system containers and containers of other types; visual representations of actions in order to perform an action for the transferred items, such as a visual representation of a printer in order to print the transferred items; etc. FIG. 12 shows a new file system container control 1200 corresponding to the destination 'folder H' container. It can be seen that items 1203, 1204, 1208, and 1212 have been transferred to the 'folder H' container, such as by moving—such that these items cease to be contained by their original 'text snippets' container, or by copying—such that they continue to be contained by their original 'text snippets' container.

Figure 13:
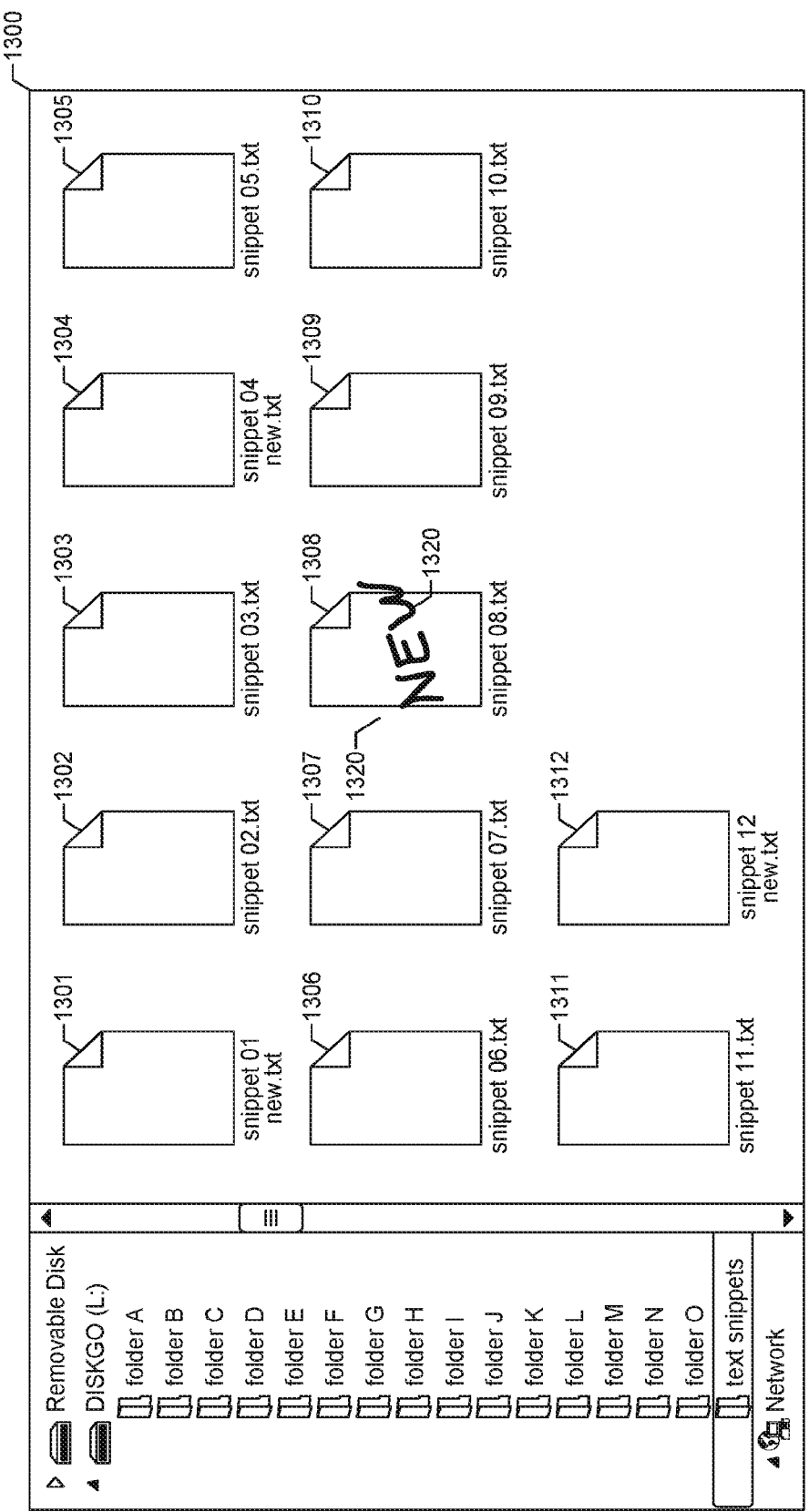
FIGS. 13 and 14 are display diagrams showing the input of a sample text filtering ink command and the facility's response thereto.
Figure 14:
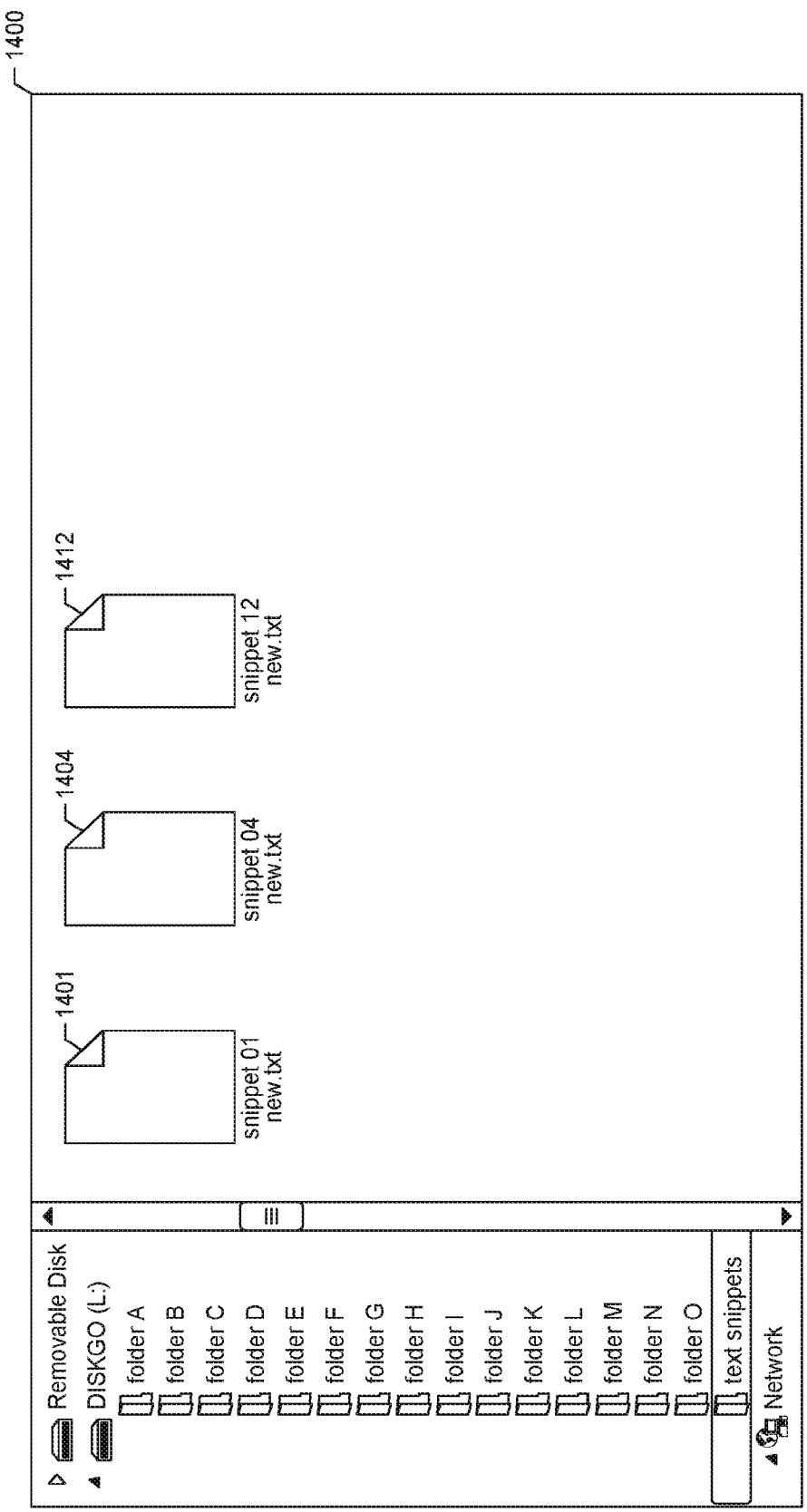

FIGS. 13 and 14 are display diagrams showing the input of a sample text filtering ink command and the facility's response thereto. FIG. 13 shows an initial state of a file system container control 1300 containing items 1301-1312, each of which has a different name that is displayed in connection with the item.

The display further shows the user's generation of ink input 1320 forming the text string 'new'. The facility recognizes ink input 1320 as a text filtering ink command specifying to filter the items in the container that are displayed to those whose name includes the string 'new'.

FIG. 14 shows the facility's response to recognizing ink input 1320 as a text filtering command. In some examples, text filtering ink commands filter the displayed items based upon attributes of the items other than name. In some examples, text filtering ink commands filter the items in a container that are displayed based upon attributes of the items that are not displayed with the items in the container. It can be seen that the effect of this ink command has been to display within the container 1400 only items 1401, 1404, and 1412 that have the string 'new' in their names, omitting to display items 1302, 1303, and 1305-1311 shown in FIG. 13 that do not have the string 'new' contained in their names.

In various examples, the facility recognizes various similar text filtering ink commands to filter items displayed in a variety of containers and other collections of items, such as lists, trees, diagrams, etc.

Figure 15:
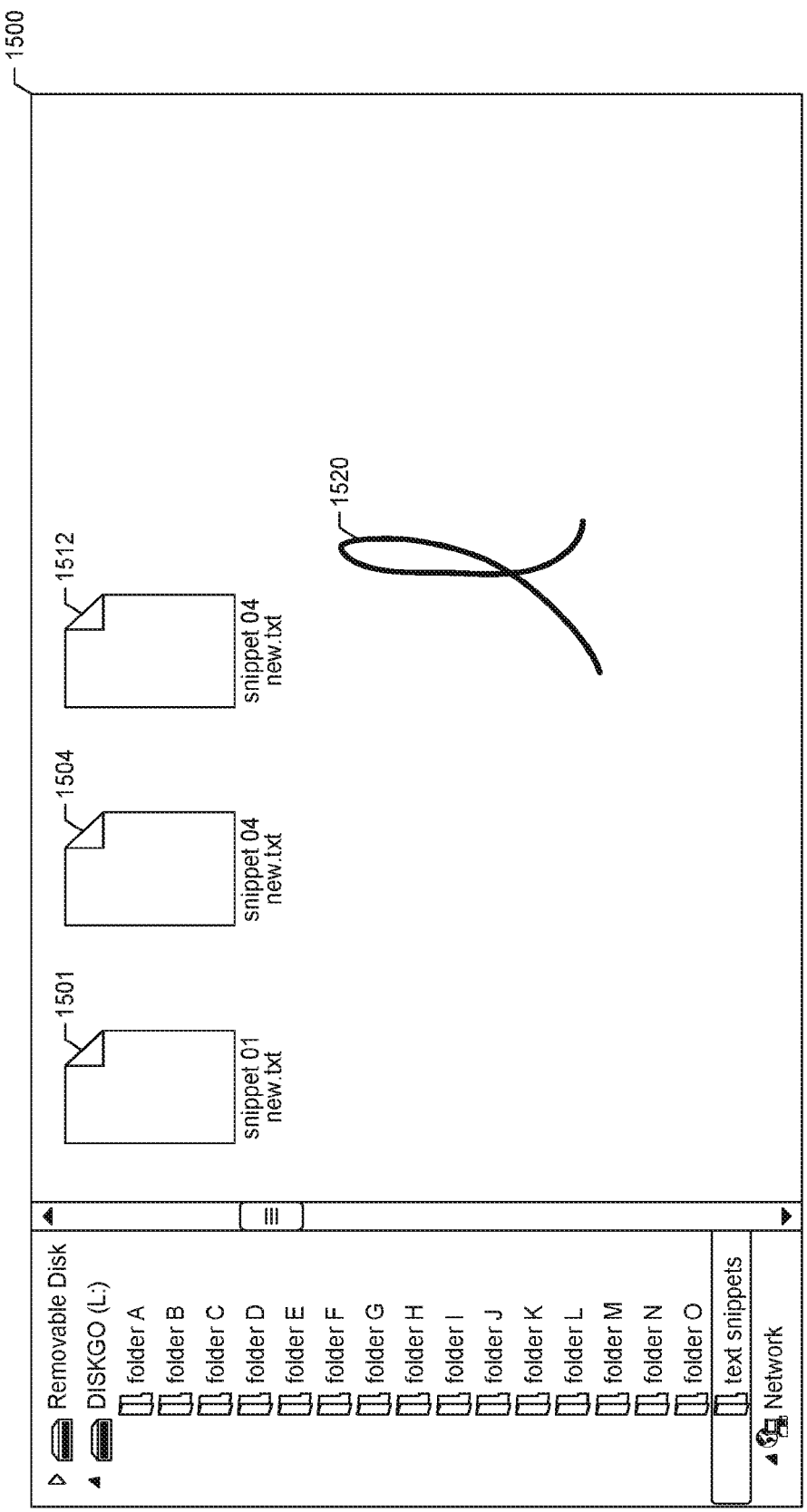
FIGS. 15 and 16 are display diagrams showing the input of a sample text filtering reversal ink command and the facility's response thereto.
Figure 16:
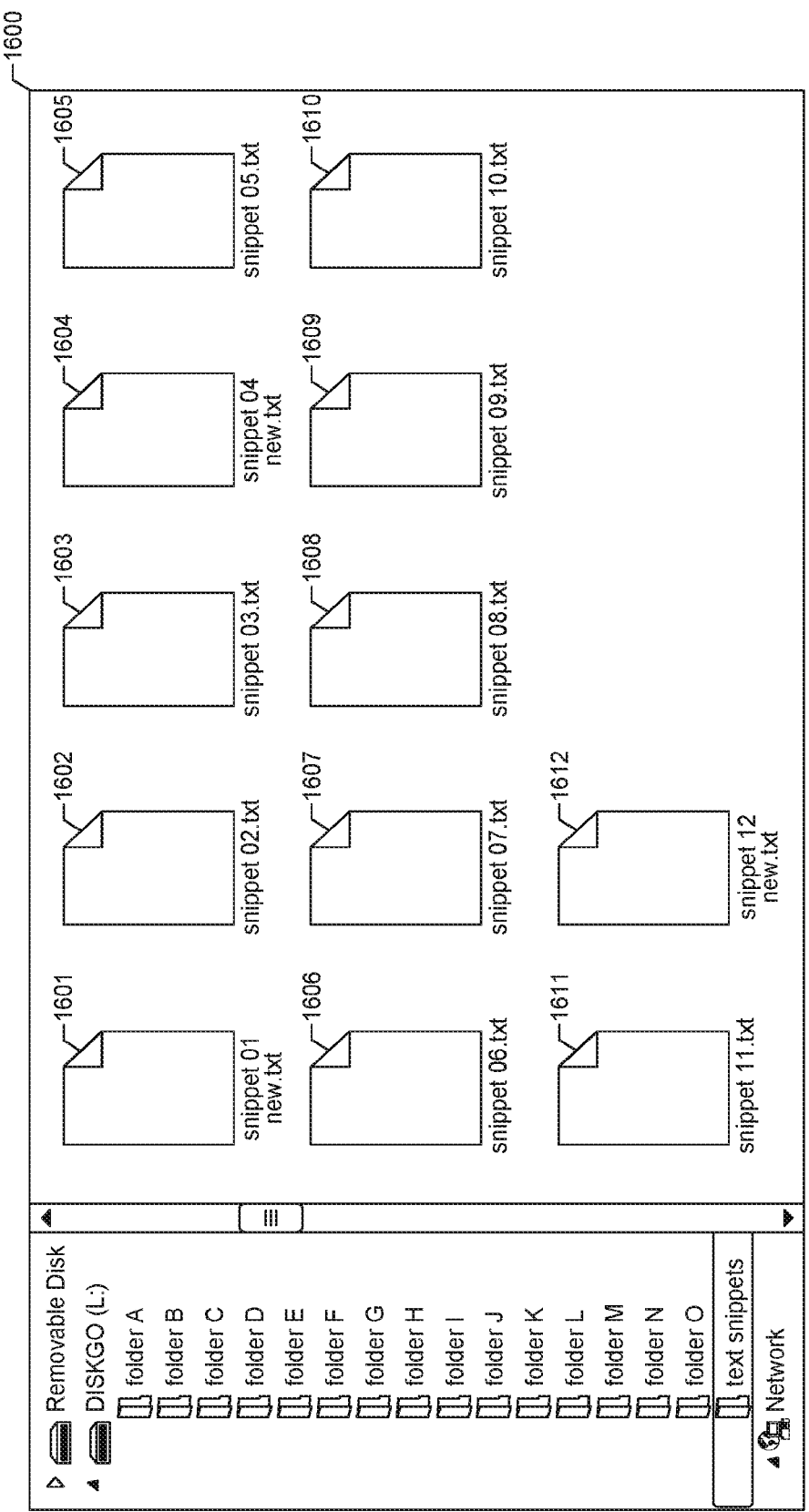

FIGS. 15 and 16 are display diagrams showing the input of a sample text filtering reversal ink command and the facility's response thereto. FIG. 15 shows an initial state of a file system container 1500 whose display has been filtered as shown in FIGS. 13 and 14 and discussed above to include only items contained by the container that have the string 'new' in their names—items 1501, 1504, and 1512.

The display further shows the user's generation of ink input 1520 forming a revert symbol. The facility recognizes ink input 1520 as a text filtering reversal command.

FIG. 16 shows the facility's response to recognizing ink input 320 as a text filtering reversal ink command. In some examples, the facility recognizes similar ink input as ink commands to reverse a variety of other positive ink commands, such as item transfer commands discussed above, deletion commands discussed below, etc. It can be seen that the effect of this ink command has been to reverse the filtering of items in file system container 1600, reverting to the display of all of the items contained by the container, items 1601-1612.

Figure 18:

FIGS. 17 and 18 are display diagrams showing the input of a sample check selection command and the facility's response thereto. FIG. 17 shows an initial state of an email inbox container control 1700. The container contains at least email items 1701-1709. The user can select email items by, for example, using the mouse to click to the left of each of one or more of the displayed email items.

The display further shows the user's generation of ink input 1721, 1722, and 1723 forming checkmarks near each of email message items 1704, 1706, and 1707. The facility recognizes ink input 1721-1723 as one or more check selection ink commands.

FIG. 18 shows the facility's response to recognizing ink input 1721-1723 as one or more check selection commands. It can be seen that the effect of this ink command has been to select email items 1804, 1806, and 1807, such as to perform a single action with respect to all three of these email items simultaneously.

In various examples, the facility recognizes a variety of similar symbols or other inking actions as selection ink commands. In various examples, the facility recognizes various similar selection commands for selecting items of a variety of types within container controls of a variety of types, or among other collections of items such as lists, trees, diagrams, etc.

In some examples (not shown), the facility recognizes symbols such as a star or asterisk as ink commands for marking an item in a container control as a favorite. Additionally, in order to mark an item as a 3-star favorite, the user can draw a series of 3 star symbols, or write the numeral 3 followed by a single star symbol.

Figure 20:
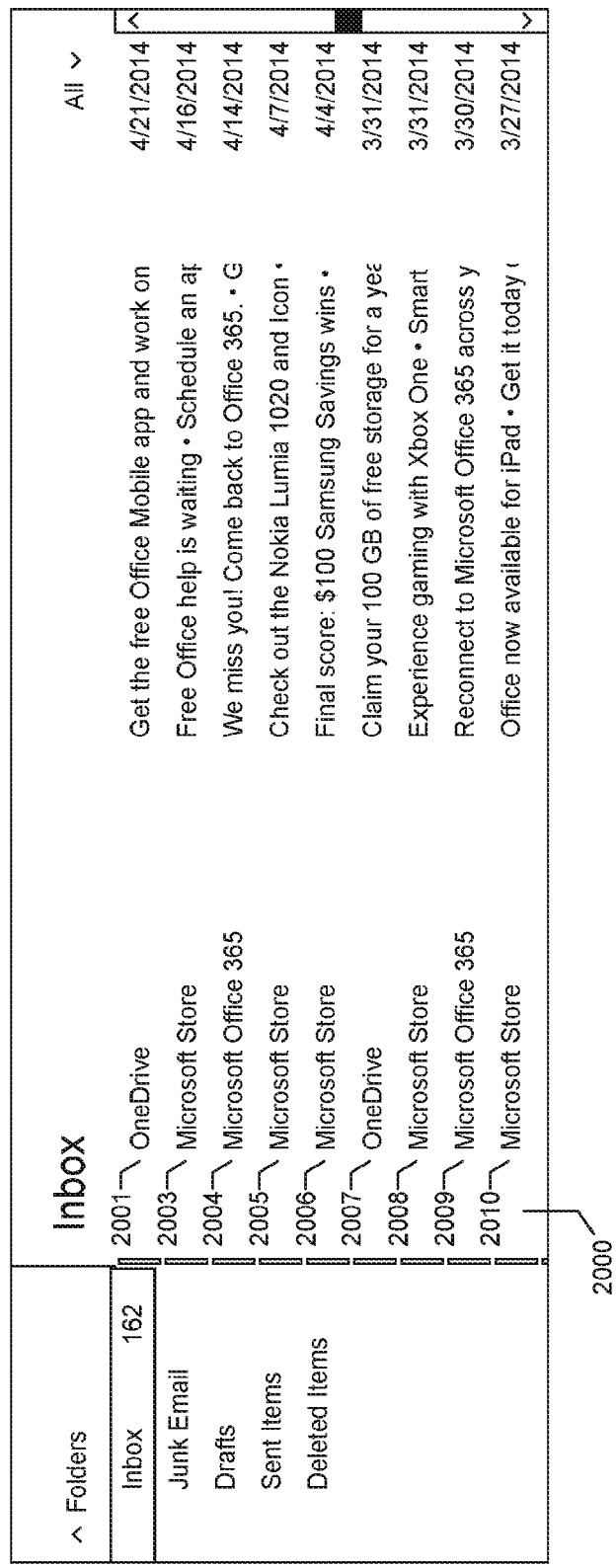

FIGS. 19 and 20 are display diagrams showing the input of a sample lineout deletion command and the facility's response thereto. FIG. 19 shows an initial state of an inbox email container control 1900, which contains at least email items 1901-1909. To delete one of the displayed email items, the user can, for example, click to its left to select it and press a delete key on the keyboard.

The display further shows the user's generation of ink input 1920 forming a horizontal line through at least a portion of email item 1902. The facility recognizes ink input 1920 as a lineout deletion ink command. In some examples, the facility recognizes other ink input shapes as lineout deletion ink commands, such as horizontal lines that, unlike the one shown in FIG. 19, omit a loop at the right end; ink input shapes constituting a back-and-forth scribble; etc.

FIG. 20 shows the facility's response to recognizing ink input 1920 as a lineout deletion command. It can be seen that the effect of this ink command has been to delete email item 1902 shown in FIG. 19, such that it is no longer contained by inbox email container 2000.

In various examples, the facility recognizes lineout deletion commands to delete items of a variety of types within container controls of a variety of types, or other collections of items, such as lists, trees, diagrams, etc.

Figure 21:
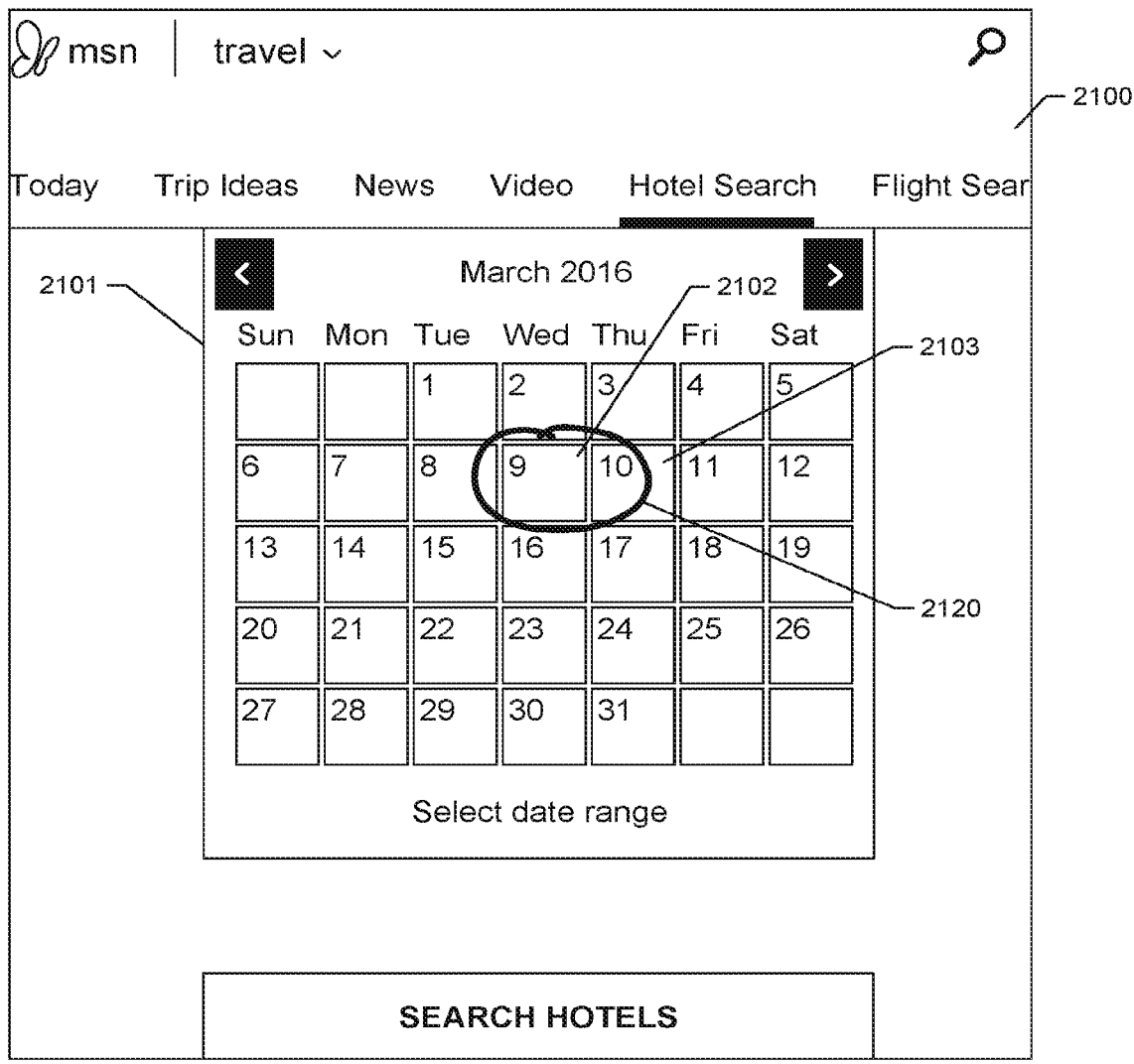
FIGS. 21 and 22 are display diagrams showing the input of a sample item picker enclosing shape ink command (similar to the enclosing shape item selection command discussed above) and the facility's response thereto.
Figure 22:
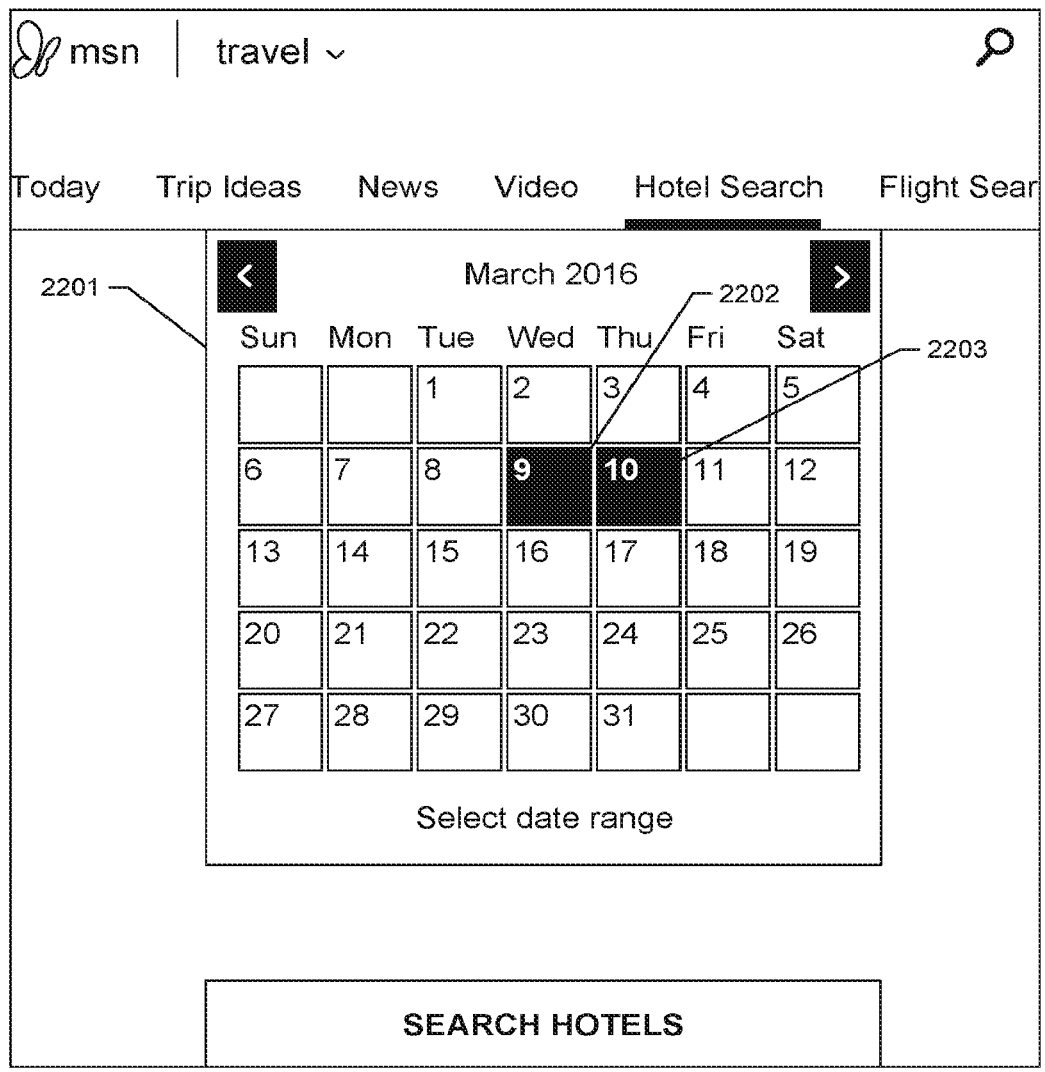

FIGS. 21 and 22 are display diagrams showing the input of a sample item picker enclosing shape ink command (similar to the enclosing shape item selection command discussed above) and the facility's response thereto. FIG. 21 shows a hotel search webpage 2100 on a travel website. The webpage contains a date picker control 2101 for selecting a date range for which to reserve a hotel room. Using a mouse, the user could do so by, for example, first clicking on the date at the beginning of the range, then clicking on the date at the end of the range.

The display further shows the user's generation of ink input 2120, forming a loop around dates 2102 (Mar. 9, 2016) and 2103 (Mar. 10, 2016). The facility recognizes ink input 2120 as an item picker enclosing shape ink command.

FIG. 22 shows the facility's response to recognizing ink input 2120 as an item picker enclosing shape ink command. It can be seen that the effect of this ink command has been to select a date range from date 2202 (Mar. 9, 2016) to date 2203 (Mar. 10, 2016).

In a variety of examples, the facility recognizes item picker enclosing shape and commands to make selections in item picker controls of a variety of kind.

Figure 23:
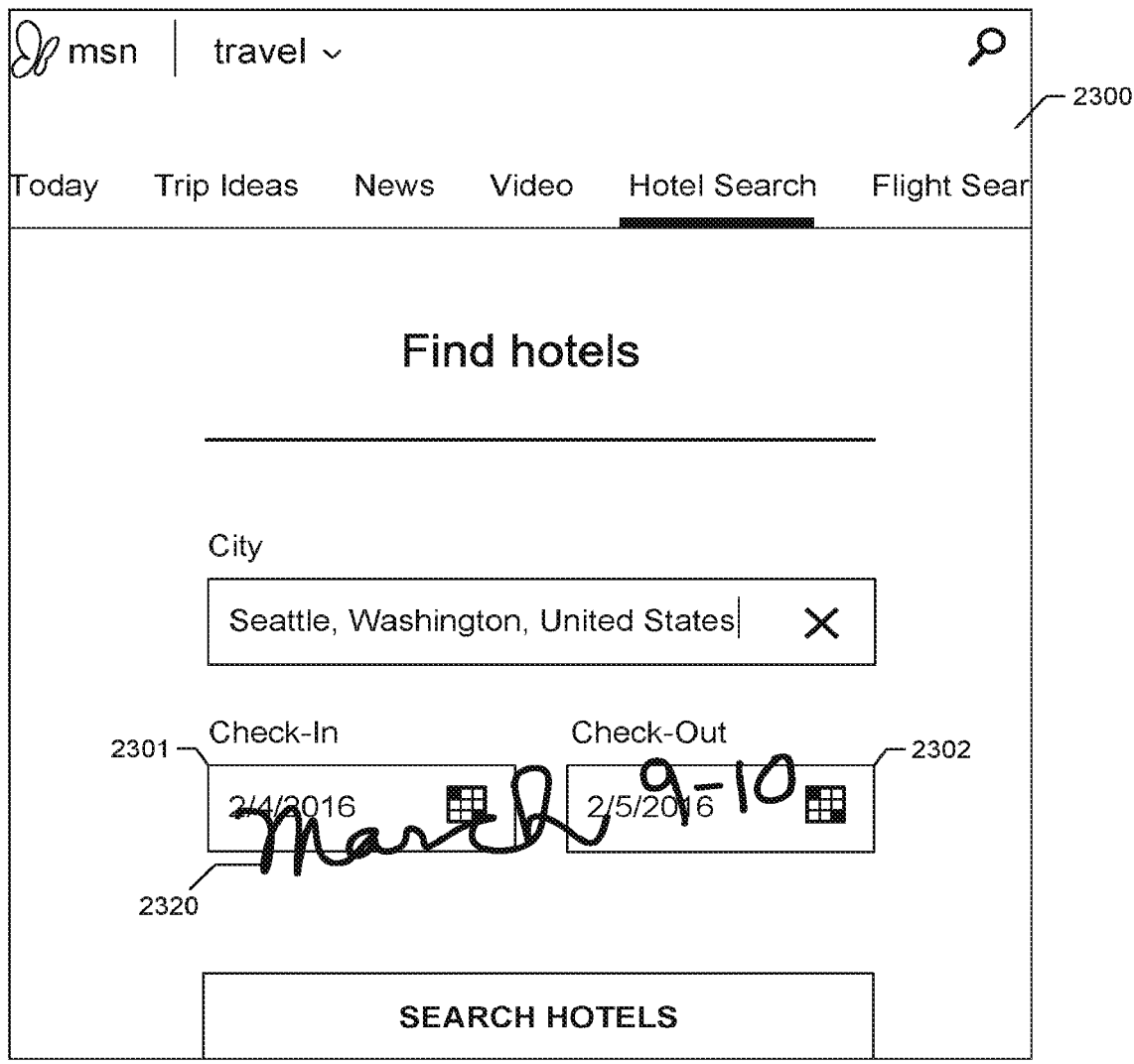
FIGS. 23 and 24 are display diagrams showing the input of a sample item picker textual date command (similar to the numerical textual ink command discussed above) and the facility's response thereto.
Figure 24:
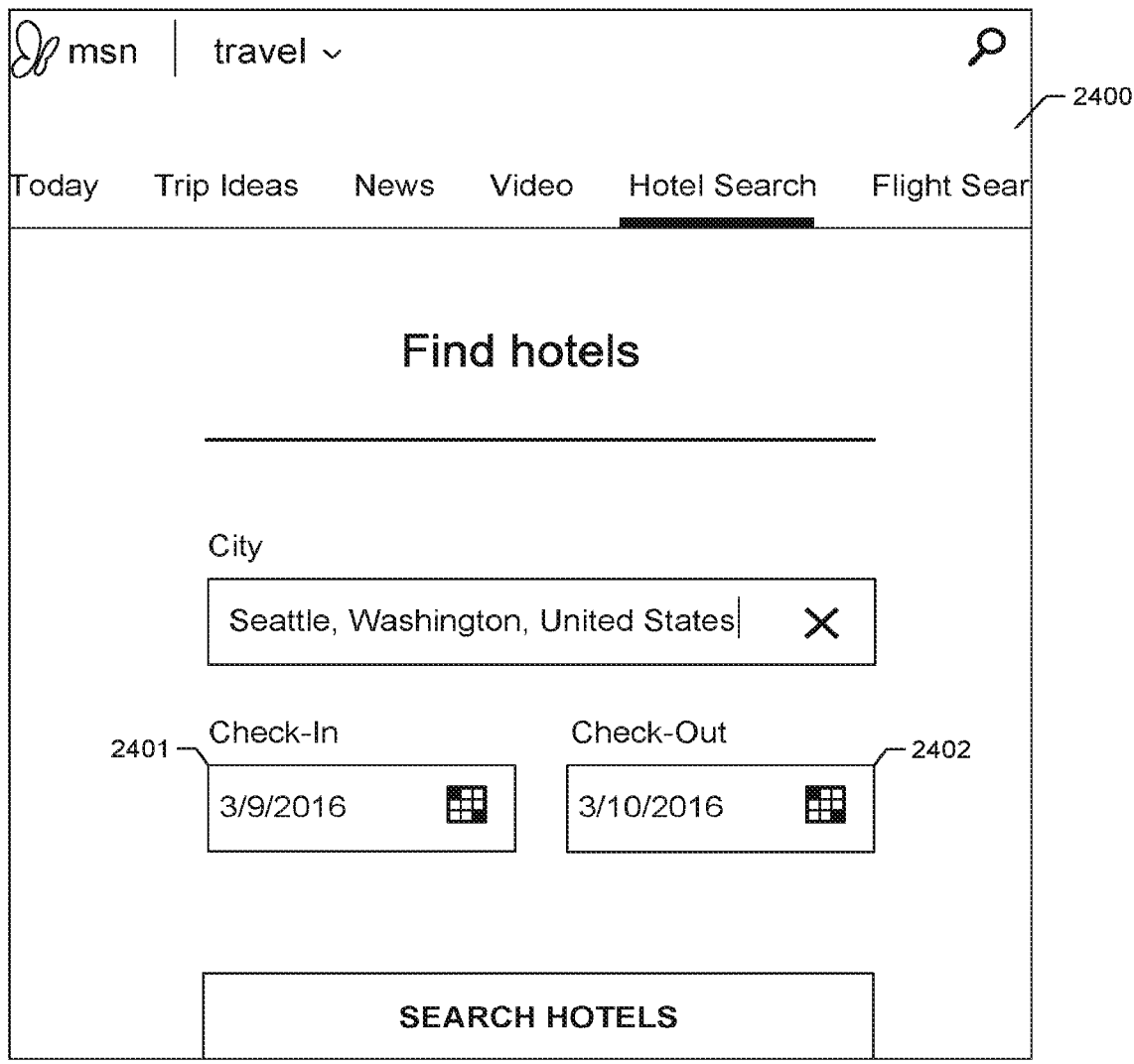

FIGS. 23 and 24 are display diagrams showing the input of a sample item picker textual date command (similar to the numerical textual ink command discussed above) and the facility's response thereto. FIG. 23 shows an initial state of a hotel reservation webpage 2300 of a travel website. The webpage includes individual date picker controls 2301 and 2302 for specifying check-in and check-out dates for which to reserve a hotel room. The user can operate these date-picker controls by, for example, clicking on each with the mouse and typing a date with the keyboard; clicking on the calendar icon within to display control 2101 shown in FIG. 21; etc.

The display further shows the user's generation of ink input 2320 forming the text 'March 9-10' near the date-picker controls. The facility recognizes ink input 2320 as an item picker textual ink command.

FIG. 24 shows the facility's response to recognizing ink input 2320 as an item picker textual ink command specifying the date range 'March 9-10'. It can be seen that the effect of this ink command has been to select in date picker control 2401 the check-in date of Mar. 9, 2016, and select in date picker control 2402 the check-out date of Mar. 10, 2016.

In some examples, the facility omits to recognize ink commands in connection with text input field controls, and/or omits to transcribe handwritten text directly into a field in any type of control, and/or transcribes handwritten text into a field in a control only after performing transformation on the recognized text.

In various examples, the facility recognizes item picker textual ink commands to make selections in a variety of types of item pickers.

In some examples, the facility provides a processor-based device, comprising: a processor; and a memory having contents that cause the processor to, in response to execution of an operating system by the processor: cause to be displayed a control operable with mouse and/or keyboard input; receive ink input proximate to the displayed control; interpret the received ink input as an ink command; and operate the displayed control in accordance with the interpreted ink command.

In some examples, the facility provides a computer-readable medium having contents configured to cause a computing system to: cause to be displayed a control operable with mouse input; receive an ink command directed to the displayed control; and operate the displayed control in accordance with the received ink command.

In some examples, the facility provides a method in a computing system, the method comprising: causing to be displayed a control operable with mouse input; receiving ink input proximate to the displayed control; interpreting the received ink input as an ink command; and operating the displayed control in accordance with the interpreted ink command.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A processor-based device, comprising:
a processor; and a memory having contents that cause the processor to, in response to execution of an operating system by the processor:

cause to be displayed a control operable with mouse and/or keyboard input, wherein the displayed control is a date picker control for setting a date, the control presenting either:

(1) a plurality of dates arranged in rows each corresponding to a week, and/or (2) two or more controls for independently setting different components of a date;

receive ink input proximate to the displayed control, wherein the received ink input is text input indicating a range of selected dates among the plurality of dates;

interpret the received ink input as an ink command; and operate the displayed control in accordance with the interpreted ink command, wherein operating the displayed control in accordance with the interpreted ink command comprises setting the indicated range of selected dates.

2. A computer-readable medium that is not a transitory signal having contents configured to cause a computing system to:

cause to be displayed a control operable with mouse input, wherein the displayed control is a control for navigating an electronic reader application displaying one or more electronic document reader pages;

receive an ink command-directed to the displayed control, wherein the received ink command comprises a selected number of hand-drawn carets pointing in a selected direction; and operate the displayed control in the selected direction in accordance with the received ink command, wherein operating the displayed control in accordance with the received ink command comprises performing the selected number of page flips in the selected direction.

\* \* \* \* \*